(12) United States Patent
Song

(10) Patent No.: US 11,423,290 B2
(45) Date of Patent: Aug. 23, 2022

(54) METHODS OF EXECUTING AN ARITHMETIC OPERATION AND SEMICONDUCTOR DEVICES PERFORMING THE ARITHMETIC OPERATION

(71) Applicant: SK hynix Inc., Icheon-si (KR)

(72) Inventor: Choung Ki Song, Yongin-si (KR)

(73) Assignee: SK hynix Inc., Icheon-si Gyeonggi-do (KR)

( * ) Notice: Subject to any disclaimer, the term of this patent is extended or adjusted under 35 U.S.C. 154(b) by 480 days.

(21) Appl. No.: 16/713,270

(22) Filed: Dec. 13, 2019

(65) Prior Publication Data

US 2021/0027149 A1     Jan. 28, 2021

(30) Foreign Application Priority Data

Jul. 26, 2019  (KR) .......................... 10-2019-0091302

(51) Int. Cl.
  *G06F 15/80* (2006.01)
  *G06N 3/063* (2006.01)
  *G06F 7/575* (2006.01)

(52) U.S. Cl.
  CPC ............. *G06N 3/063* (2013.01); *G06F 7/575* (2013.01)

(58) Field of Classification Search
  CPC .................................. G06N 3/063; G06F 7/575
  See application file for complete search history.

(56) References Cited

U.S. PATENT DOCUMENTS

| | | | |
|---|---|---|---|
| 5,256,911 A * | 10/1993 | Holler .................. | G06N 3/0635 |
| | | | 706/37 |
| 9,588,840 B2 | 3/2017 | Chung et al. | |
| 10,360,971 B1 * | 7/2019 | Hokenmaier .......... | G11C 11/54 |
| 11,170,290 B2 * | 11/2021 | Hoang .................... | G11C 11/54 |
| 2019/0244087 A1 * | 8/2019 | Park ........................ | G06V 10/82 |
| 2019/0251432 A1 * | 8/2019 | Motomura ............. | G06N 3/063 |
| 2020/0193277 A1 * | 6/2020 | Kwon .................... | G06N 3/063 |
| 2021/0027149 A1 * | 1/2021 | Song ....................... | G06F 7/575 |
| 2021/0150319 A1 * | 5/2021 | Yu ............................ | G06N 3/08 |

FOREIGN PATENT DOCUMENTS

KR    1020170008999 A    1/2017

* cited by examiner

*Primary Examiner* — Cheng Yuan Tseng
(74) *Attorney, Agent, or Firm* — William Park & Associates Ltd.

(57) ABSTRACT

A semiconductor device includes an operation control signal generation circuit and a neural network circuit. The operation control signal generation circuit generates an arithmetic signal and a core read signal based on a command. The neural network circuit outputs first core data and second core data from a core region based on the core read signal, a cell block selection signal, and a cell selection signal. The neural network circuit also performs an arithmetic operation of the first and second core data based on the arithmetic signal to generate arithmetic result data.

20 Claims, 17 Drawing Sheets

131

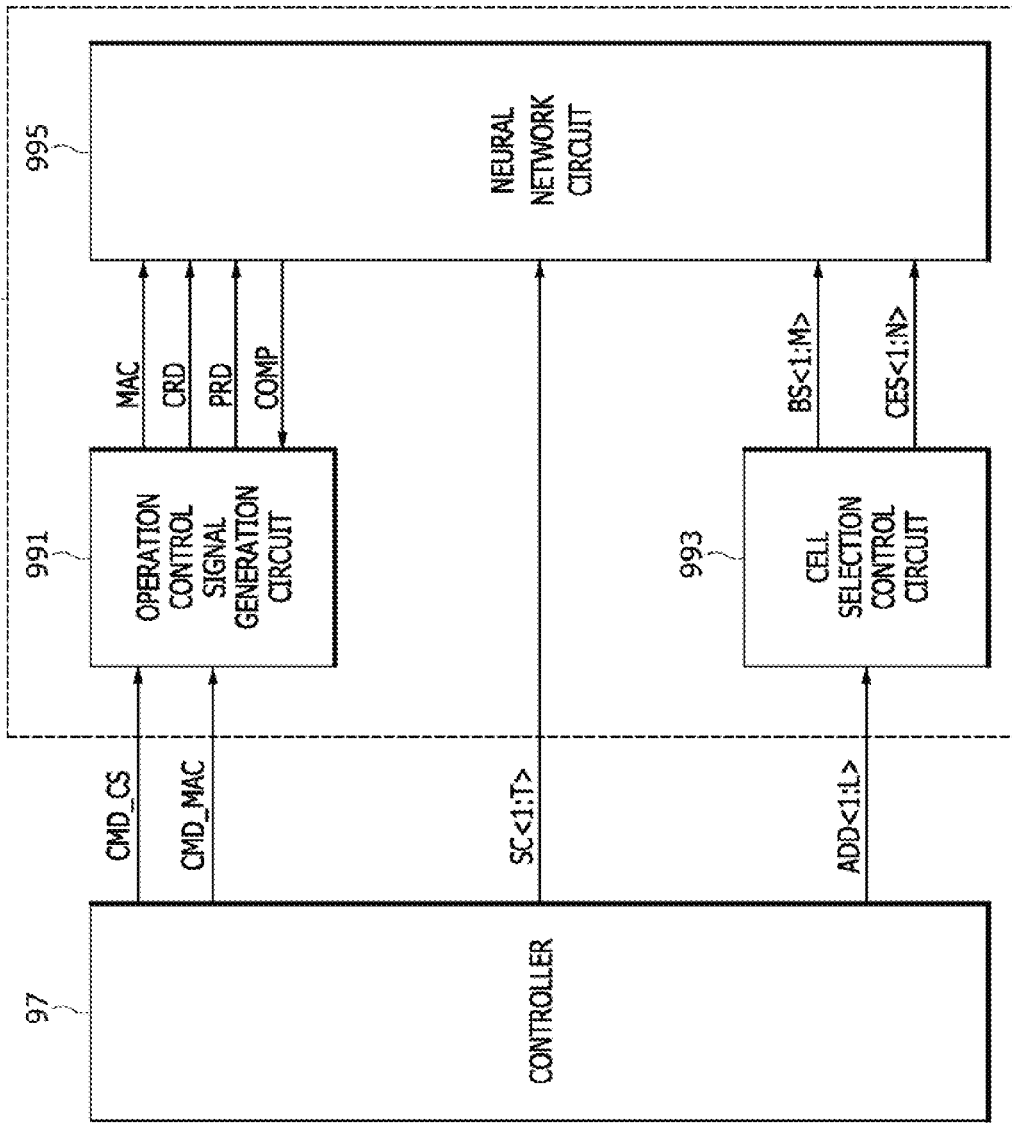

METHODS OF EXECUTING AN ARITHMETIC OPERATION AND SEMICONDUCTOR DEVICES PERFORMING THE ARITHMETIC OPERATION

CROSS-REFERENCE TO RELATED APPLICATIONS

The present application claims priority under 35 U.S.C 119(a) to Korean Application No. 10-2019-0091302, filed on Jul. 26, 2019, which is incorporated herein by reference in its entirety.

BACKGROUND

1. Technical Field

Embodiments of the present disclosure relate to methods of executing an arithmetic operation of semiconductor devices including a neural network and semiconductor devices performing the arithmetic operation.

2. Related Art

In a neural network, neurons, mathematically modelled to resemble to a human brain, are connected to each other to form a network. Recently, neural network technologies have been rapidly developing. Accordingly, a lot of effort has been focused on analyzing input data and extracting useful information using neural network technologies in various electronic devices.

SUMMARY

Based on an embodiment, a semiconductor device includes an operation control signal generation circuit and a neural network circuit. The operation control signal generation circuit generates an arithmetic signal and a core read signal based on a command. The neural network circuit outputs a first core data and a second core data, from a core region, based on the core read signal, a cell block selection signal, and a cell selection signal. The neural network circuit also performs an arithmetic operation of the first and second core data based on the arithmetic signal to generate an arithmetic result data.

Based on another embodiment, a semiconductor device includes an operation control signal generation circuit and a neural network circuit. The operation control signal generation circuit generates an arithmetic signal, a core read signal, and a peripheral read signal based on a command. The neural network circuit outputs a core data, from the core region, based on the core read signal, a cell block selection signal, and a cell selection signal. The neural network circuit inputs peripheral data into a peripheral region through a pad and outputs the peripheral data from the peripheral region based on the peripheral read signal. The neural network circuit performs an arithmetic operation of the core data and the peripheral data based on the arithmetic signal to generate an arithmetic result data.

Based on another embodiment, a semiconductor device includes an operation control signal generation circuit, a mode register, and a neural network circuit. The operation control signal generation circuit generates an arithmetic signal and a core read signal based on a first command and a comparison pulse. The mode register extracts a target code from an address to store the target code therein based on a second command. The neural network circuit outputs a first core data and a second core data, from a core region, based on the core read signal, a cell block selection signal, and a cell selection signal. The neural network circuit performs an arithmetic operation of the first core data and the second core data based on the arithmetic signal to generate an arithmetic result data. The neural network circuit generates a count code based on the arithmetic signal. The neural network circuit compares the count code with the target code to generate the comparison pulse.

Based on another embodiment, a semiconductor device includes an operation control signal generation circuit, a mode register, and a neural network circuit. The operation control signal generation circuit generates an arithmetic signal, a core read signal, and a peripheral read signal based on a first command and a comparison pulse. The mode register extracts a target code from an address to store the target code therein based on a second command. The neural network circuit outputs a core data, from a core region, based on the core read signal, a cell block selection signal, and a cell selection signal. The neural network circuit inputs peripheral data into a peripheral region through a pad based on the peripheral read signal. The neural network circuit performs an arithmetic operation of the core data and the peripheral data based on the arithmetic signal to generate an arithmetic result data. The neural network circuit generates a count code based on the arithmetic signal. The neural network circuit compares the count code with the target code to generate the comparison pulse.

Based on another embodiment, a semiconductor device includes an operation control signal generation circuit and a neural network circuit. The operation control signal generation circuit generates an arithmetic signal and a core read signal based on a command and a comparison pulse. The neural network circuit outputs a first core data and a second core data, from a core region, based on the core read signal, a cell block selection signal, and a cell selection signal. The neural network circuit performs an arithmetic operation of the first and second core data based on the arithmetic signal to generate an arithmetic result data. The neural network circuit generates a count code based on the arithmetic signal. The neural network circuit compares the count code with a target code to generate the comparison pulse.

Based on another embodiment, a semiconductor device includes an operation control signal generation circuit and a neural network circuit. The operation control signal generation circuit generates an arithmetic signal, a core read signal, and a peripheral read signal based on a command and a comparison pulse. The neural network circuit outputs a core data, from a core region, based on the core read signal, a cell block selection signal, and a cell selection signal. The neural network circuit inputs peripheral data into a peripheral region through a pad based on the peripheral read signal. The neural network circuit performs an arithmetic operation of the core data and the peripheral data based on the arithmetic signal to generate an arithmetic result data. The neural network circuit generates a count code based on the arithmetic signal. The neural network circuit compares the count code with a target code to generate the comparison pulse.

Based on another embodiment, there is provided a method of executing an arithmetic operation. The method includes generating an arithmetic signal and a core read signal based on a command, generating a first core data and a second core data based on the core read signal, a cell block selection signal, and a cell selection signal, and performing an arithmetic operation of the first and second core data based on the arithmetic signal to generate an arithmetic result data.

Based on another embodiment, there is provided a method of executing an arithmetic operation. The method includes generating an arithmetic signal, a core read signal, and a peripheral read signal based on a command, generating a core data based on the core read signal, a cell block selection signal, and a cell selection signal, generating peripheral data based on the peripheral read signal, and performing an arithmetic operation of the core data and the peripheral data based on the arithmetic signal to generate an arithmetic result data.

Based on another embodiment, there is provided a method of executing an arithmetic operation. The method includes generating an arithmetic signal and a core read signal based on a first command and a comparison pulse, extracting a target code from an address to store the target code based on a second command, generating a first core data and a second core data based on the core read signal, a cell block selection signal, and a cell selection signal, performing an arithmetic operation of the first and second core data based on the arithmetic signal to generate an arithmetic result data, and comparing a count code generated based on the arithmetic signal with the target code to generate the comparison pulse.

Based on another embodiment, there is provided a method of executing an arithmetic operation. The method includes generating an arithmetic signal, a core read signal, and a peripheral read signal based on a first command and a comparison pulse, extracting a target code from an address to store the target code based on a second command, generating a core data based on the core read signal, a cell block selection signal, and a cell selection signal, generating peripheral data based on the peripheral read signal, performing an arithmetic operation of the core data and the peripheral data based on the arithmetic signal to generate an arithmetic result data, and comparing a count code generated based on the arithmetic signal with the target code to generate the comparison pulse.

BRIEF DESCRIPTION OF THE DRAWINGS

FIG. 17 is a block diagram, illustrating a configuration of a semiconductor system, based on another embodiment of the present disclosure.

DETAILED DESCRIPTION OF THE EMBODIMENTS

Various embodiments of the present disclosure will be described hereinafter with reference to the accompanying drawings. However, the embodiments described herein are for illustrative purposes only and are not intended to limit the scope of the present disclosure.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

Figure 1:
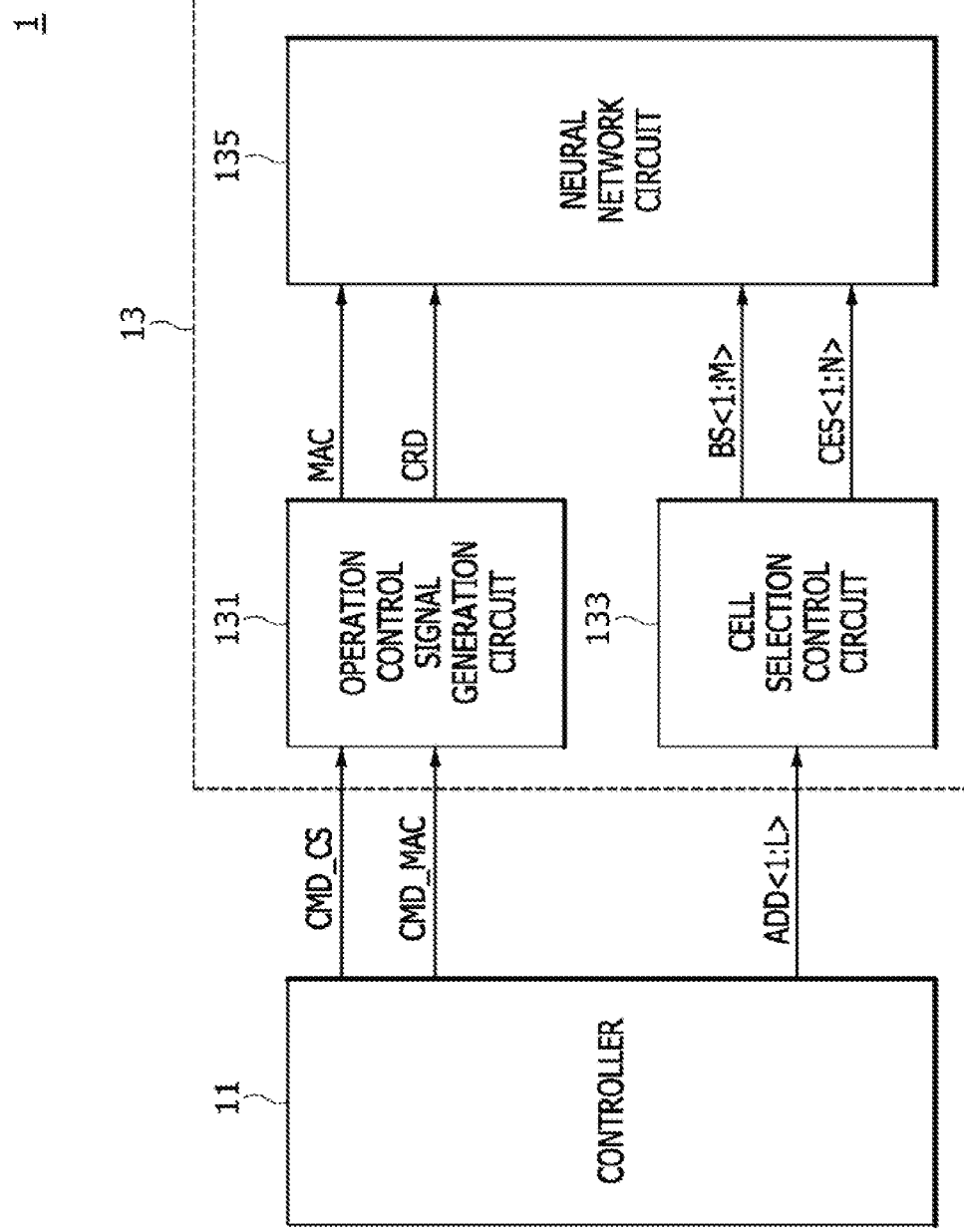
FIG. 1 is a block diagram, illustrating a configuration of a semiconductor system, based on an embodiment of the present disclosure.

As illustrated in FIG. 1, a semiconductor system 1, based on an embodiment, may include a controller 11 and a semiconductor device 13. The semiconductor device 13 may include an operation control signal generation circuit 131, a cell selection control circuit 133, and a neural network circuit 135.

The controller 11 may generate and output a first command CMD_CS, a second command CMD_MAC, and an address ADD<1:L> to the semiconductor device 13. The controller 11 may transmit the first command CMD_CS, the second command CMD_MAC, and the address ADD<1:L> to the semiconductor device 13 through signal lines that the first and second commands CMD_CS, CMD_MAC, and the address ADD<1:L> share with each other. In some embodiments, the controller 11 may be synchronized with a clock signal (not shown) to transmit the first command CMD_CS, the second command CMD_MAC, and the address ADD<1:

L> to the semiconductor device 13. The number "L" of bits of the address ADD<1:L> may be different based on the embodiments.

The operation control signal generation circuit 131 may generate an arithmetic signal MAC and a core read signal CRD based on the first command CMD_CS and the second command CMD_MAC. The operation control signal generation circuit 131 may generate the arithmetic signal MAC and the core read signal CRD when the first command CMD_CS and the second command CMD_MAC are generated. The arithmetic signal MAC may be generated to perform an arithmetic operation used in a neural network (i.e., the neural network circuit 135). The core read signal CRD may be generated to perform a read operation for outputting first core data (CD1 of FIG. 3) and second core data (CD2 of FIG. 3) from a core region (21 of FIG. 3). In some embodiments, the operation control signal generation circuit 131 may generate the core read signal CRD after generating the arithmetic signal MAC. A configuration and an operation of the operation control signal generation circuit 131 will be described in more detail with reference to FIG. 2 later.

The cell selection control circuit 133 may generate a cell block selection signal BS<1:M> and a cell selection signal CES<1:N> based on the address ADD<1:L>. The cell selection control circuit 133 may decode the address ADD<1:L> to generate the cell block selection signal BS<1:M> and the cell selection signal CES<1:N>. A logic level combination of the cell block selection signal BS<1:M> may select one of the cell blocks included in the core region (21 of FIG. 3). A logic level combination of the cell selection signal CES<1:N> may be set to select at least one of the cells included in the selected cell block. The number "M" of bits of the cell block selection signal BS<1:M> may be different based on the embodiments. The number "N" of bits of the cell selection signal CES<1:N> may also be different based on the embodiments.

The neural network circuit 135 may output the first core data (CD1 of FIG. 3) and the second core data (CD2 of FIG. 3) from the core region (21 of FIG. 3) when the core read signal CRD is generated and may perform the arithmetic operation of the first core data (CD1 of FIG. 3) and the second core data (CD2 of FIG. 3) to generate an arithmetic result data (LDATA of FIG. 3) based on an arithmetic control pulse (MSP of FIG. 3), generated from the arithmetic signal MAC. The arithmetic operation, used in the neural network, may include at least one of a multiplying operation and an adding operation for feature values and weighted values. The arithmetic operation, used in the neural network, may be performed to sort features, included in an input layer, into result values, included in an output layer. The arithmetic operation, used in the neural network, may be performed using various functions, such as SIGMOID, Tanh, ReLU, or the like. The feature values may be values, corresponding to the features included in the input layer, and the weighted values may be values, influencing the features included in the input layer to be sorted into the result values, included in the output layer. The first core data (CD1 of FIG. 3) may be set as the feature values, used in the neural network, and the second core data (CD2 of FIG. 3) may be set as the weighted values, used in the neural network. Alternatively, the first core data (CD1 of FIG. 3) may be set as the weighted values, used in the neural network, and the second core data (CD2 of FIG. 3) may be set as the feature values, used in the neural network. A configuration and an operation of the neural network circuit 135 will be described in more detail with reference to FIGS. 3 and 4.

Figure 2:
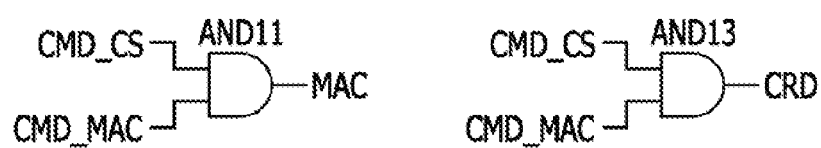
FIG. 2 is a circuit diagram, illustrating an example of an operation control signal generation circuit, included in the semiconductor system of FIG. 1.

Referring to FIG. 2, the operation control signal generation circuit 131 may include AND gates AND11 and AND13. The AND gate AND11 may perform a logical AND operation of the first command CMD_CS and the second command CMD_MAC to generate the arithmetic signal MAC. The AND gate AND11 may generate the arithmetic signal MAC, having a logic "high" level, when both of the first command CMD_CS and the second command CMD_MAC are generated to have a logic "high" level. The AND gate AND13 may perform a logical AND operation of the first command CMD_CS and the second command CMD_MAC to generate the core read signal CRD. The AND gate AND13 may generate the core read signal CRD, having a logic "high" level, when both of the first command CMD_CS and the second command CMD_MAC are generated to have a logic "high" level. The operation control signal generation circuit 131 may generate the arithmetic signal MAC and the core read signal CRD when the first command CMD_CS and the second command CMD_MAC are generated.

Figure 3:
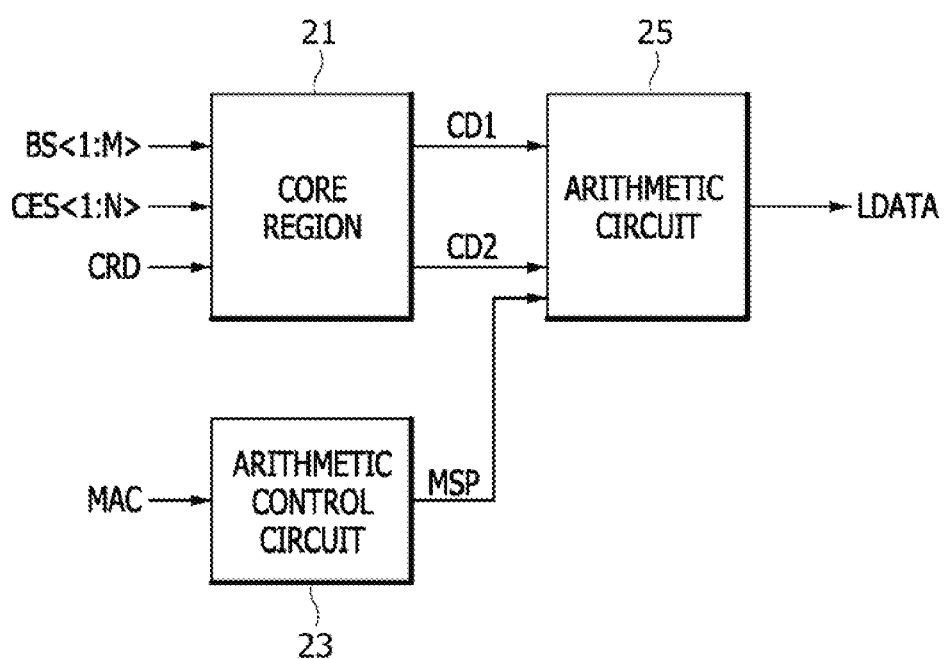
FIG. 3 is a block diagram, illustrating an example of a neural network circuit, included in the semiconductor system of FIG. 1.

Referring to FIG. 3, the neural network circuit 135 may include the core region 21, an arithmetic control circuit 23, and an arithmetic circuit 25.

The core region 21 may include a plurality of cell blocks, and each of the plurality of cell blocks may include a plurality of cells. The core region 21 may receive the cell block selection signal BS<1:M> and the cell selection signal CES<1:N> to select one of the plurality of cell blocks and some of the plurality of cells, included in the selected cell block and may output data, stored in the selected cells, as the first and second core data CD1 and CD2 when the core read signal CRD is generated. A circuit for outputting the data stored in the selected cells may be realized using a general circuit which is employed in the read operation. The first core data CD1 may be set as the feature values used in the neural network, and the second core data CD2 may be set as the weighted values used in the neural network. Alternatively, the first core data CD1 may be set as the weighted values used in the neural network, and the second core data CD2 may be set as the feature values used in the neural network.

The arithmetic control circuit 23 may generate the arithmetic control pulse MSP when the arithmetic signal MAC is generated. The arithmetic control circuit 23 may include a delay circuit (not shown) so that the arithmetic control pulse MSP is generated when a delay period elapses when the arithmetic signal MAC is generated. The arithmetic control circuit 23 may generate the arithmetic control pulse MSP after the first and second core data CD1 and CD2 are outputted from the core region 21.

The arithmetic circuit 25 may receive the first and second core data CD1 and CD2 to perform the arithmetic operation, used in the neural network, with the first and second core data CD1 and CD2 and to generate the arithmetic result data LDATA when the arithmetic control pulse MSP is generated. The arithmetic operation may be performed using various functions such as SIGMOID, Tanh, ReLU or the like.

Figure 4:
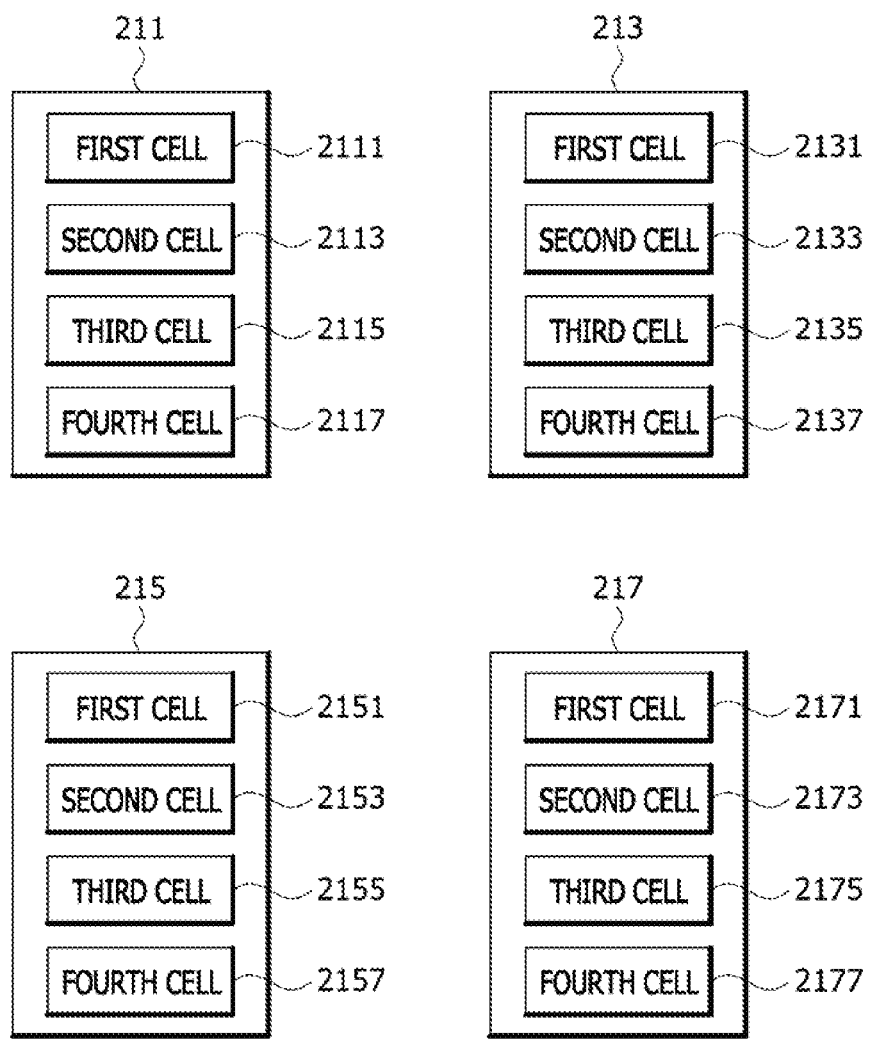
FIG. 4 is a schematic view, illustrating a configuration of a core region, included in the neural network circuit of FIG. 3.

Referring to FIG. 4, the core region 21 may include a first cell block 211, a second cell block 213, a third cell block 215, and a fourth cell block 217. The first cell block 211 may include a first cell 2111, a second cell 2113, a third cell 2115, and a fourth cell 2117. The second cell block 213 may include a first cell 2131, a second cell 2133, a third cell 2135, and a fourth cell 2137. The third cell block 215 may include a first cell 2151, a second cell 2153, a third cell 2155, and a fourth cell 2157. The fourth cell block 217 may include a first cell 2171, a second cell 2173, a third cell 2175, and a fourth cell 2177.

Any one of the first to fourth cell blocks 211, 213, 215, and 217 included in the core region 21 may be selected by the cell block selection signal BS<1:M>. For example, the first cell block 211 may be selected when the cell block selection signal BS<1:M> has a first logic level combination, the second cell block 213 may be selected when the cell block selection signal BS<1:M> has a second logic level combination, the third cell block 215 may be selected when the cell block selection signal BS<1:M> has a third logic level combination, and the fourth cell block 217 may be selected when the cell block selection signal BS<1:M> has a fourth logic level combination. In some embodiments, at least two of the first to fourth cell blocks 211, 213, 215, and 217 may be selected by the cell block selection signal BS<1:M>.

Any one of the first to fourth cells 2111, 2113, 2115, and 2117 included in the first cell block 211 may be selected by the cell selection signal CES<1:N>. For example, the first cell 2111 may be selected when the cell selection signal CES<1:N> has a fifth logic level combination, the second cell 2113 may be selected when the cell selection signal CES<1:N> has a sixth logic level combination, the third cell 2115 may be selected when the cell selection signal CES<1:N> has a seventh logic level combination, and the fourth cell 2117 may be selected when the cell selection signal CES<1:N> has an eighth logic level combination. In some embodiments, at least two of the first to fourth cells 2111, 2113, 2115, and 2117 included in the first cell block 211 may be selected by the cell selection signal CES<1:N>.

Any one of the first to fourth cells 2131, 2133, 2135, and 2137 included in the second cell block 213 may be selected by the cell selection signal CES<1:N>. In some embodiments, at least two of the first to fourth cells 2131, 2133, 2135, and 2137 included in the second cell block 213 may be selected by the cell selection signal CES<1:N>.

Any one of the first to fourth cells 2151, 2153, 2155, and 2157 included in the third cell block 215 may be selected by the cell selection signal CES<1:N>. In some embodiments, at least two of the first to fourth cells 2151, 2153, 2155, and 2157 included in the third cell block 215 may be selected by the cell selection signal CES<1:N>.

Any one of the first to fourth cells 2171, 2173, 2175, and 2177 included in the fourth cell block 217 may be selected by the cell selection signal CES<1:N>. In some embodiments, at least two of the first to fourth cells 2171, 2173, 2175, and 2177 included in the fourth cell block 217 may be selected by the cell selection signal CES<1:N>.

Figure 5:
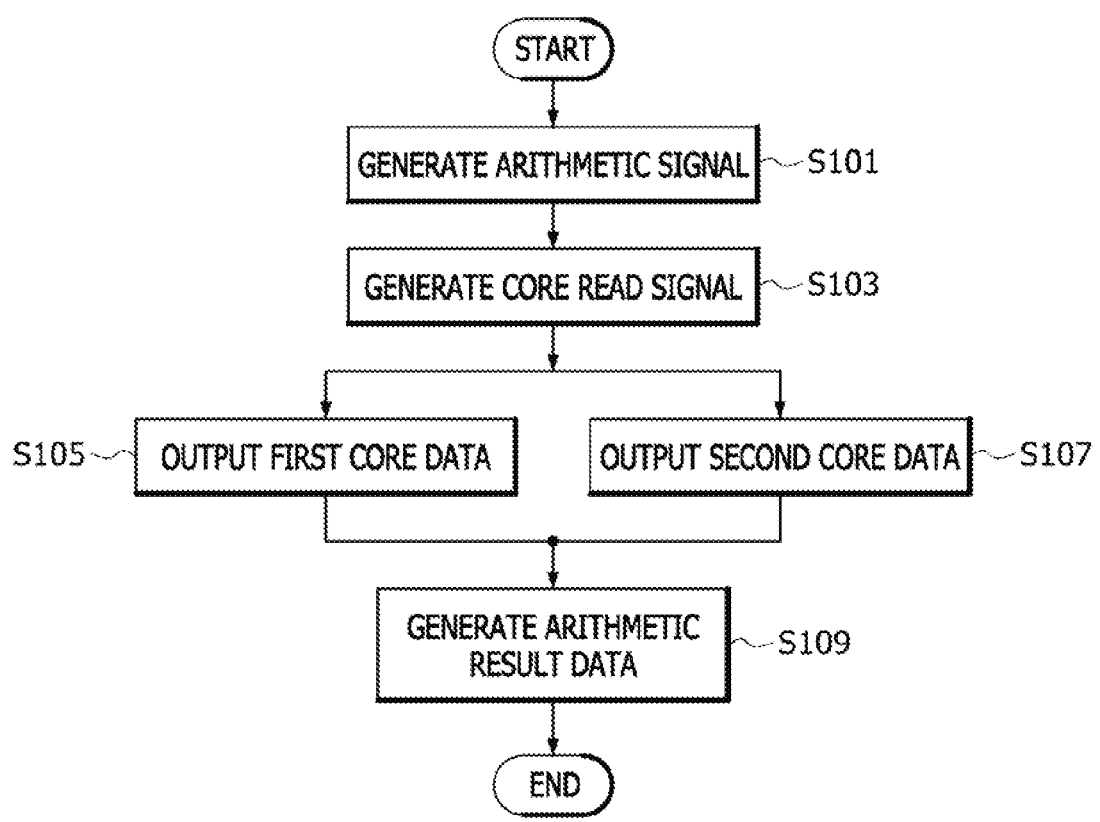
FIG. 5 is a flowchart, illustrating operations of the semiconductor system, shown in FIG. 1.

Operations of the semiconductor system 1 will be described in detail hereinafter with reference to FIG. 5.

When the controller 11 applies the first command CMD_CS, the second command CMD_MAC, and the address ADD<1:L> to the semiconductor device 13, the semiconductor device 13 may generate the arithmetic signal MAC from the first and second commands CMD_CS and CMD_MAC (see a step S101) and may also generate the core read signal CRD from the first and second commands CMD_CS and CMD_MAC (see a step S103). When the core read signal CRD is generated, the data stored in the cells selected by the cell block selection signal BS<1:M> and the cell selection signal CES<1:N> may be outputted as the first and second core data CD1 and CD2 (see steps S105 and S107). As a result of the arithmetic operation of the first and second core data CD1 and CD2, the arithmetic result data LDATA may be generated (see a step S109).

As described above, the semiconductor device 13 of the semiconductor system 1 based on an embodiment may receive the first and second commands CMD_CS and CMD_ MAC only once to output the first and second core data CD1 and CD2 from the core region 21 and may perform the arithmetic operation of the first and second core data CD1 and CD2 to generate the arithmetic result data LDATA. Thus, it may be possible to enhance the efficiency of the arithmetic operation and to improve the speed of the arithmetic operation.

Figure 6:
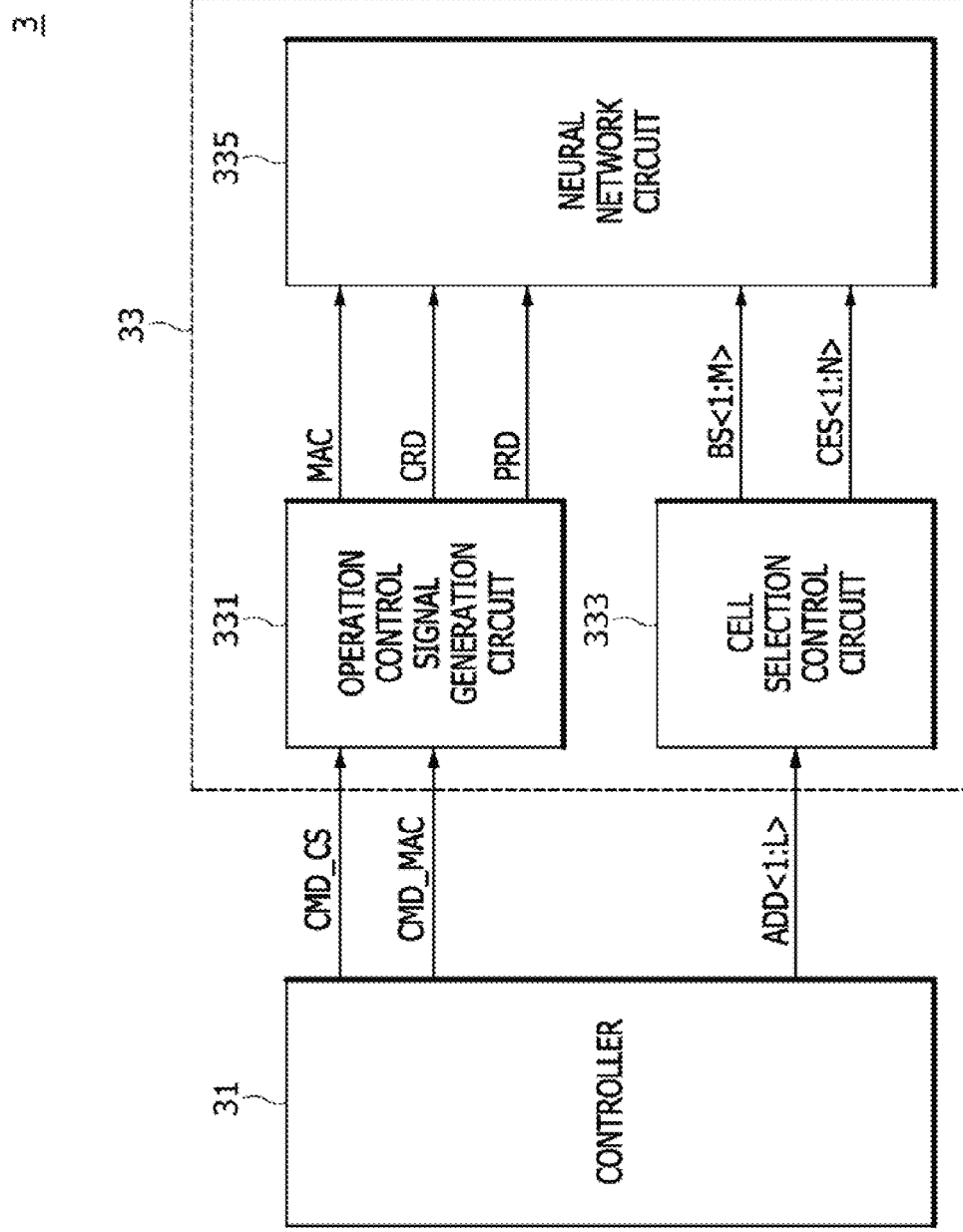
FIG. 6 is a block diagram, illustrating a configuration of a semiconductor system, based on another embodiment of the present disclosure.

As illustrated in FIG. 6, a semiconductor system 3 based on another embodiment may include a controller 31 and a semiconductor device 33. The semiconductor device 33 may include an operation control signal generation circuit 331, a cell selection control circuit 333, and a neural network circuit 335.

The controller 31 may generate and output a first command CMD_CS, a second command CMD_MAC, and an address ADD<1:L> to the semiconductor device 33. The controller 31 may transmit the first command CMD_CS, the second command CMD_MAC, and the address ADD<1:L> to the semiconductor device 33 through signal lines that the first and second commands CMD_CS and CMD_MAC and the address ADD<1:L> share with each other. In some embodiments, the controller 31 may be synchronized with a clock signal (not shown) to transmit the first command CMD_CS, the second command CMD_MAC, and the address ADD<1:L> to the semiconductor device 33. The number "L" of bits of the address ADD<1:L> may be different based on the embodiments.

The operation control signal generation circuit 331 may generate an arithmetic signal MAC, a core read signal CRD, and a peripheral read signal PRD based on the first command CMD_CS and the second command CMD_MAC. The operation control signal generation circuit 331 may generate the arithmetic signal MAC, the core read signal CRD, and the peripheral read signal PRD when the first command CMD_CS and the second command CMD_MAC are generated. The arithmetic signal MAC may be generated to perform an arithmetic operation used in a neural network (i.e., the neural network circuit 335). The core read signal CRD may be generated to perform a read operation for outputting core data (CD of FIG. 8) from a core region (41 of FIG. 8). The peripheral read signal PRD may be generated to perform a read operation for inputting peripheral data (PD of FIG. 8) into a peripheral region (45 of FIG. 8) through a pad (43 of FIG. 8) and for outputting the peripheral data (PD of FIG. 8) from the peripheral region (45 of FIG. 8). In some embodiments, the operation control signal generation circuit 331 may generate the core read signal CRD and the peripheral read signal PRD after generating the arithmetic signal MAC. A configuration and an operation of the operation control signal generation circuit 331 will be described in more detail with reference to FIG. 7 later.

The cell selection control circuit 333 may generate a cell block selection signal BS<1:M> and a cell selection signal CES<1:N> based on the address ADD<1:L>. The cell selection control circuit 333 may decode the address ADD<1:L> to generate the cell block selection signal BS<1:M> and the cell selection signal CES<1:N>. A logic level combination of the cell block selection signal BS<1:M> may be set to select one of cell blocks included in the core region (41 of FIG. 8). A logic level combination of the cell selection signal CES<1:N> may be set to select at least one of cells included in the selected cell block. The number "M" of bits of the cell block selection signal BS<1:M> may be different based on the embodiments. The number "N" of bits of the cell selection signal CES<1:N> may also be set to be different based on the embodiments.

The neural network circuit 335 may output the core data (CD of FIG. 8) from the core region (41 of FIG. 8) when the core read signal CRD is generated, may output the peripheral data (PD of FIG. 8), which are inputted to the peripheral region (45 of FIG. 8) through the pad (43 of FIG. 8), from the peripheral region (45 of FIG. 8) when the peripheral read signal PRD is generated, and may perform the arithmetic operation of the core data (CD of FIG. 8) and the peripheral data (PD of FIG. 8) to generate an arithmetic result data (LDATA of FIG. 8) based on an arithmetic control pulse (MSP of FIG. 8) generated from the arithmetic signal MAC. The core data (CD of FIG. 8) may be set as the feature values, used in the neural network, and the peripheral data (PD of FIG. 8) may be set as the weighted values, used in the neural network. Alternatively, the core data (CD of FIG. 8) may be set as the weighted values, and the peripheral data (PD of FIG. 8) may be set as the feature values. A configuration and an operation of the neural network circuit 335 will be described in more detail with reference to FIG. 8 later.

Figure 7:
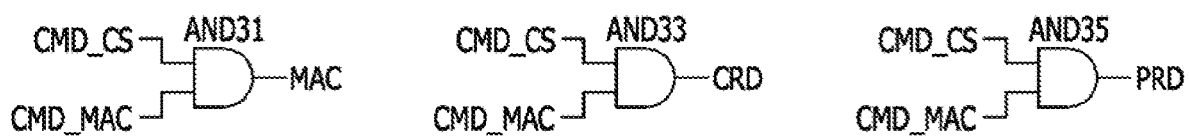
FIG. 7 is a circuit diagram, illustrating an example of an operation control signal generation circuit, included in the semiconductor system of FIG. 6.

Referring to FIG. 7, the operation control signal generation circuit 331 may include AND gates AND31, AND33, and AND35. The AND gate AND31 may perform a logical AND operation of the first command CMD_CS and the second command CMD_MAC to generate the arithmetic signal MAC. The AND gate AND31 may generate the arithmetic signal MAC having a logic "high" level when both of the first command CMD_CS and the second command CMD_MAC are generated to have a logic "high" level. The AND gate AND33 may perform a logical AND operation of the first command CMD_CS and the second command CMD_MAC to generate the core read signal CRD. The AND gate AND33 may generate the core read signal CRD having a logic "high" level when both of the first command CMD_CS and the second command CMD_MAC are generated to have a logic "high" level. The AND gate AND33 may perform a logical AND operation of the first command CMD_CS and the second command CMD_MAC to generate the peripheral read signal PRD. The AND gate AND35 may generate the peripheral read signal PRD having a logic "high" level when both of the first command CMD_CS and the second command CMD_MAC are generated to have a logic "high" level. The operation control signal generation circuit 331 may generate the arithmetic signal MAC, the core read signal CRD, and the peripheral read signal PRD when the first command CMD_CS and the second command CMD_MAC are generated.

Figure 8:
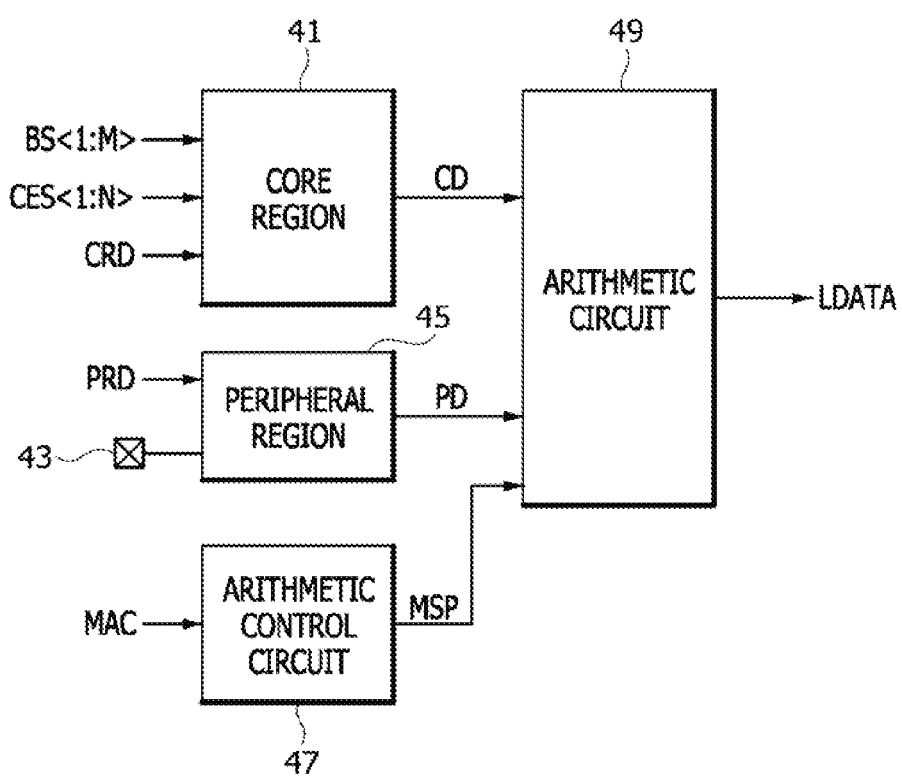
FIG. 8 is a block diagram, illustrating an example of a neural network circuit, included in the semiconductor system of FIG. 6.

Referring to FIG. 8, the neural network circuit 335 may include the core region 41, the pad 43, the peripheral region 45, an arithmetic control circuit 47, and an arithmetic circuit 49.

The core region 41 may include a plurality of cell blocks, and each of the plurality of cell blocks may include a plurality of cells. The core region 41 may receive the cell block selection signal BS<1:M> and the cell selection signal CES<1:N> to select one of the plurality of cell blocks and some of the plurality of cells included in the selected cell block and may output data stored in the selected cells as the core data CD when the core read signal CRD is generated. A circuit for outputting the data stored in the selected cells may be realized using a general circuit which is employed in the read operation. The core data CD may be set as the feature values or the weighted values.

The peripheral region 45 may receive the peripheral data PD through the pad 43 and may output the peripheral data PD when the peripheral read signal PRD is generated. The peripheral data PD may be set as the feature values or the weighted values.

The arithmetic control circuit 47 may generate the arithmetic control pulse MSP when the arithmetic signal MAC is generated. The arithmetic control circuit 47 may include a delay circuit (not shown) such that the arithmetic control pulse MSP is generated when a delay period elapses when the arithmetic signal MAC is generated. The arithmetic control circuit 47 may generate the arithmetic control pulse MSP after the core data CD are outputted from the core region 41 and the peripheral data PD are outputted from the peripheral region 45.

The arithmetic circuit 49 may receive the core data CD and the peripheral data PD to perform the arithmetic operation with the core data CD and the peripheral data PD and to generate the arithmetic result data LDATA when the arithmetic control pulse MSP is generated. The arithmetic operation may be performed using various functions such as SIGMOID, Tanh, ReLU or the like.

Figure 9:
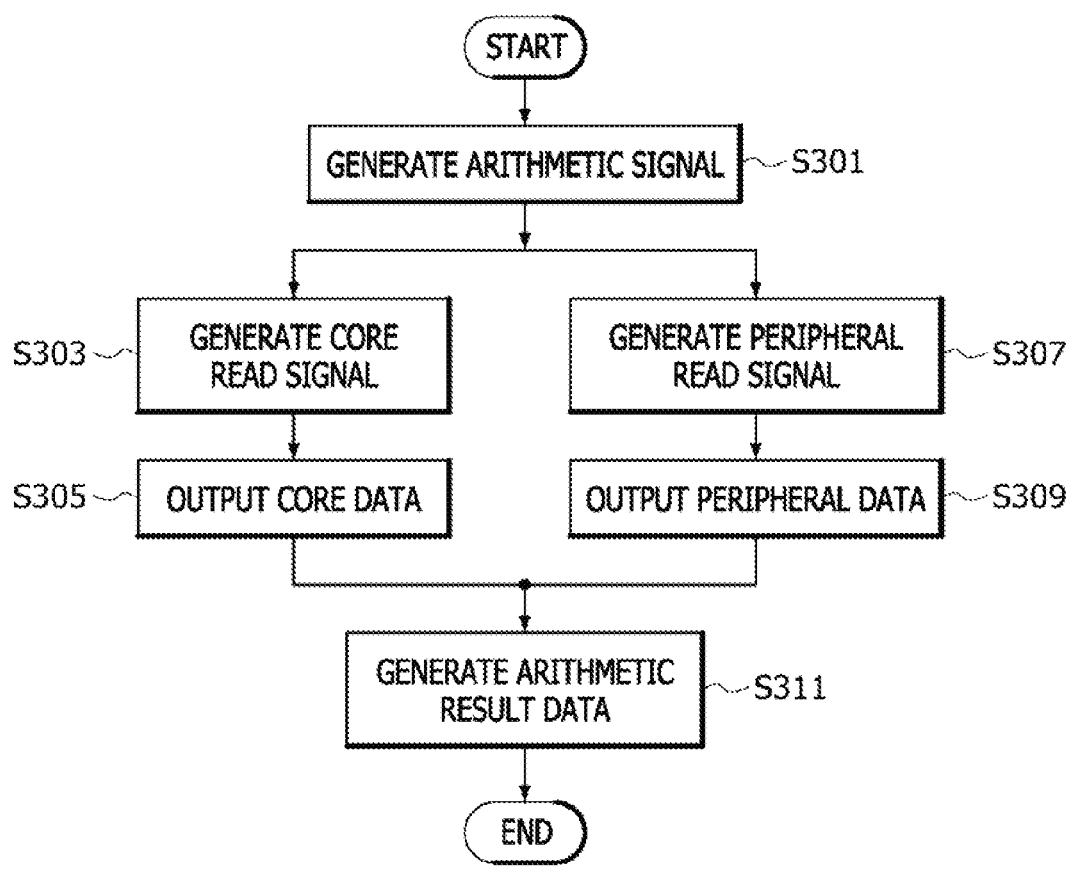
FIG. 9 is a flowchart, illustrating operations of the semiconductor system, shown in FIG. 6.

Operations of the semiconductor system 3 will be described in detail hereinafter with reference to FIG. 9.

When the controller 31 applies the first command CMD_CS, the second command CMD_MAC, and the address ADD<1:L> to the semiconductor device 33, the semiconductor device 33 may generate the arithmetic signal MAC from the first and second commands CMD_CS and CMD_MAC (see a step S301) and may also generate the core read signal CRD and the peripheral read signal PRD from the first and second commands CMD_CS and CMD_MAC (see step S303 and S307). When the core read signal CRD is generated, the data stored in the cells selected by the cell block selection signal BS<1:M> and the cell selection signal CES<1:N> may be outputted as the core data CD (see a step S305). When the peripheral read signal PRD is generated, the peripheral data PD may be outputted from the peripheral region 45 (see a step S309). As a result of the arithmetic operation of the core data CD and the peripheral data PD, the arithmetic result data LDATA may be generated (see a step S311).

As described above, the semiconductor device 33 of the semiconductor system 3 based on an embodiment may receive the first and second commands CMD_CS and CMD_MAC only once to respectively output the core data CD and the peripheral data PD from the core region 41 and the peripheral region 45 and may perform the arithmetic operation of the core data CD and the peripheral data PD to generate the arithmetic result data LDATA. Thus, it may be possible to enhance the efficiency of the arithmetic operation and to improve the speed of the arithmetic operation.

Figure 10:
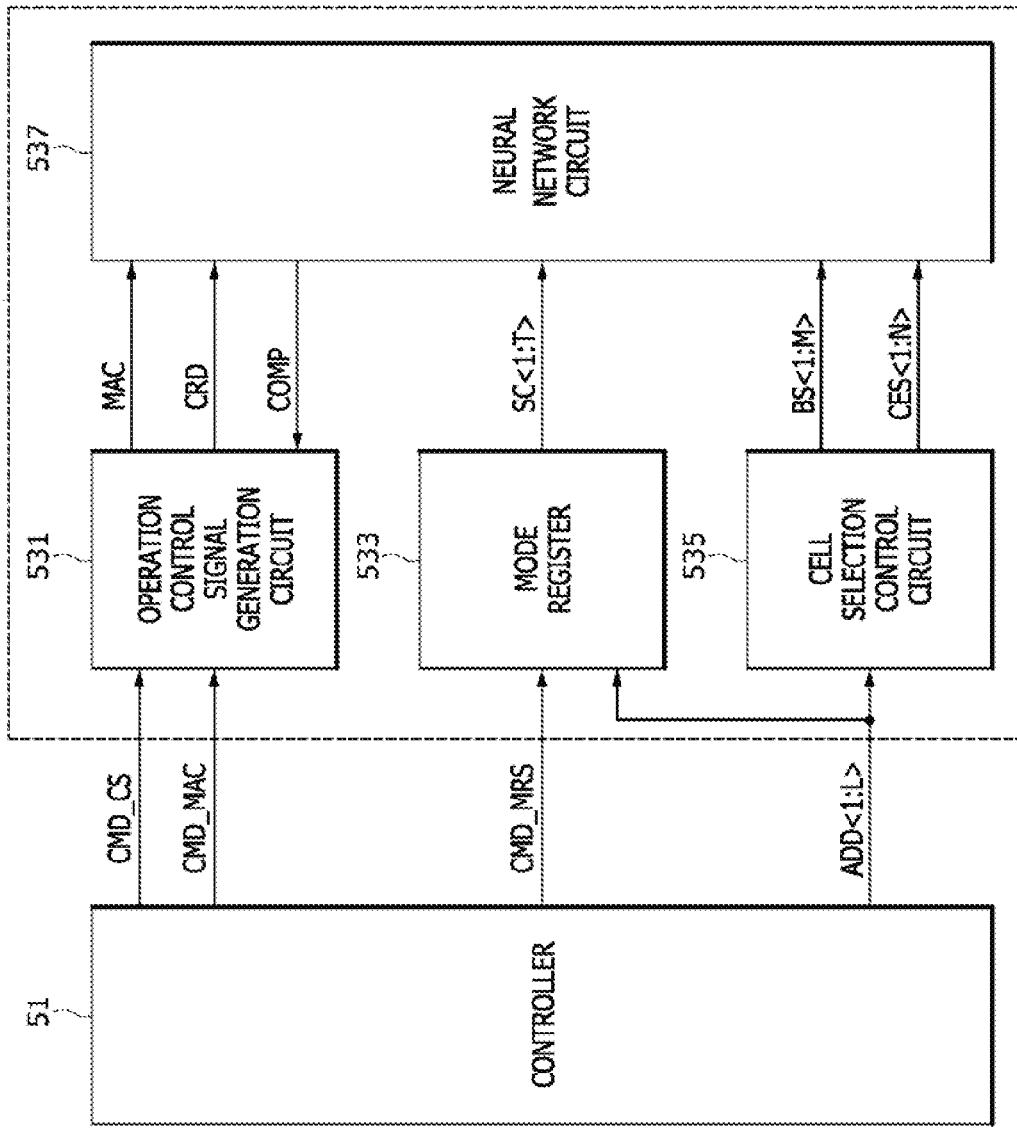
FIG. 10 is a block diagram, illustrating a configuration of a semiconductor system, based on another embodiment of the present disclosure.

As illustrated in FIG. 10, a semiconductor system 5 based on an embodiment may include a controller 51 and a semiconductor device 53. The semiconductor device 53 may include an operation control signal generation circuit 531, a mode register 533, a cell selection control circuit 535, and a neural network circuit 537.

The controller 51 may generate and output a first command CMD_CS, a second command CMD_MAC, a third command CMD_MRS, and an address ADD<1:L> to the semiconductor device 53. The controller 51 may transmit the first command CMD_CS, the second command CMD_MAC, the third command CMD_MRS, and the address ADD<1:L> to the semiconductor device 53 through signal lines that the first to third commands CMD_CS, CMD_MAC, and CMD_MRS and the address ADD<1:L> share with each other. In some embodiments, the controller 51 may be synchronized with a clock signal (not shown) to transmit the first command CMD_CS, the second command CMD_MAC, the third command CMD_MRS, and the address ADD<1:L> to the semiconductor device 53. The number "L" of bits of the address ADD<1:L> may be different based on the embodiments.

The operation control signal generation circuit 531 may generate an arithmetic signal MAC and a core read signal CRD based on the first command CMD_CS, the second command CMD_MAC, and a comparison pulse COMP. The operation control signal generation circuit 531 may generate the arithmetic signal MAC and the core read signal CRD when the first command CMD_CS and the second command CMD_MAC are generated. The arithmetic signal MAC may be generated to perform an arithmetic operation used in a neural network (i.e., the neural network circuit 537). The core read signal CRD may be generated to perform a read operation for outputting first core data (CD1 of FIG. 11) and second core data (CD2 of FIG. 11) from a core region (61 of FIG. 11). In some embodiments, the operation control signal generation circuit 531 may generate the core read signal CRD after generating the arithmetic signal MAC. The operation control signal generation circuit 531 may generate the arithmetic signal MAC and the core read signal CRD when the comparison pulse COMP is created. The operation control signal generation circuit 531 may be realized such that the comparison pulse COMP is buffered to generate the arithmetic signal MAC and the core read signal CRD.

The mode register 533 may extract a target code SC<1:T> from the address ADD<1:L> to store the target code SC<1:T> therein when the third command CMD_MRS is generated. Bits used for extracting the target code SC<1:T> from the address ADD<1:L> among bits included in the address ADD<1:L> may be different based on the embodiments. A logic level combination of the target code SC<1:T> may be set to correspond to the number of times that the arithmetic operation is repeatedly performed whenever the first and second commands CMD_CS and CMD_MAC for generating the arithmetic signal MAC are generated once. For example, when the target code SC<1:T> has a logic level combination of '110', the arithmetic operation may be repeatedly performed by six times. The number of times that the arithmetic operation is repeatedly performed by the target code SC<1:T> may be different based on the embodiments.

The cell selection control circuit 535 may generate a cell block selection signal BS<1:M> and a cell selection signal CES<1:N> based on the address ADD<1:L>. The cell selection control circuit 535 may decode the address ADD<1:L> to generate the cell block selection signal BS<1:M> and the cell selection signal CES<1:N>. A logic level combination of the cell block selection signal BS<1:M> may be set to select one of cell blocks included in the core region (61 of FIG. 11). A logic level combination of the cell selection signal CES<1:N> may be set to select at least one of cells included in the selected cell block. The number "M" of bits of the cell block selection signal BS<1:M> may be different based on the embodiments. The number "N" of bits of the cell selection signal CES<1:N> may also be set to be different based on the embodiments.

The neural network circuit 537 may output the first core data (CD1 of FIG. 11) and the second core data (CD2 of FIG. 11) from the core region (61 of FIG. 11) when the core read signal CRD is generated and may perform the arithmetic operation of the first core data (CD1 of FIG. 11) and the second core data (CD2 of FIG. 11) to generate an arithmetic result data (LDATA of FIG. 11) based on an arithmetic control pulse (MSP of FIG. 11) generated from the arithmetic signal MAC. The neural network circuit 537 may discriminate whether the arithmetic operation is repeatedly performed by a predetermined number of times, which is set by the target code SC<1:T>, to generate the comparison pulse COMP. The neural network circuit 537 may repeatedly perform the arithmetic operation by the predetermined number of times, which is set by the target code SC<1:T>, to generate the arithmetic result data (LDATA of FIG. 11) for each arithmetic operation.

Figure 11:
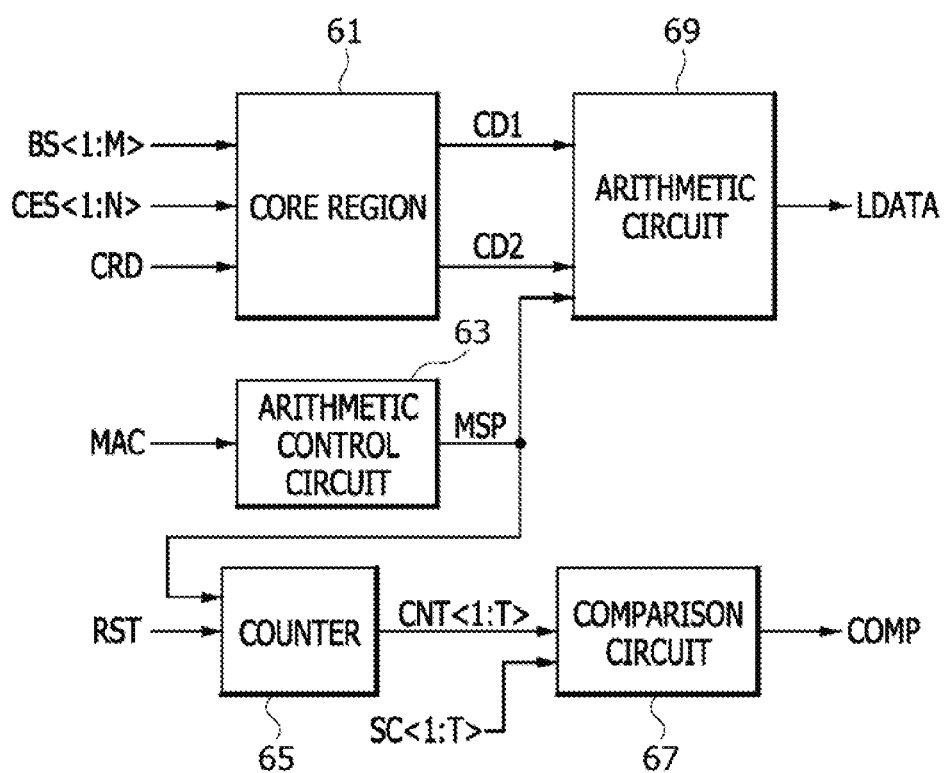
FIG. 11 is a block diagram, illustrating an example of a neural network circuit, included in the semiconductor system of FIG. 10.

Referring to FIG. 11, the neural network circuit 537 may include the core region 61, an arithmetic control circuit 63, a counter 65, a comparison circuit 67, and an arithmetic circuit 69.

The core region 61 may include a plurality of cell blocks, and each of the plurality of cell blocks may include a plurality of cells. The core region 21 may receive the cell block selection signal BS<1:M> and the cell selection signal CES<1:N> to select one of the plurality of cell blocks and some of the plurality of cells included in the selected cell block and may output data stored in the selected cells as the first and second core data CD1 and CD2, when the core read signal CRD is generated. A circuit for outputting the data stored in the selected cells may be realized using a general circuit which is employed in the read operation. The first core data CD1 may be set as the feature values, used in the neural network, and the second core data CD2 may be set as the weighted values, used in the neural network. Alternatively, the first core data CD1 may be set as the weighted values, and the second core data CD2 may be set as the feature values.

The arithmetic control circuit 63 may generate the arithmetic control pulse MSP when the arithmetic signal MAC is generated. The arithmetic control circuit 63 may include a delay circuit (not shown) such that the arithmetic control pulse MSP is generated when a delay period elapses when the arithmetic signal MAC is generated. The arithmetic control circuit 63 may generate the arithmetic control pulse MSP after the first and second core data CD1 and CD2 are outputted from the core region 61.

The counter 65 may initialize a count code CNT<1:T> when a reset signal RST is generated. The reset signal RST may be generated when an initialization operation that a power supply voltage is applied to the semiconductor system 5 is performed. The count code CNT<1:T> may be initialized such that all of bits included in the count code CNT<1:T> have a logic "low" level. The counter 65 may perform a counting operation to generate the count code CNT<1:T> when the arithmetic control pulse MSP is created. For example, if the count code CNT<1:T> has three bits and the arithmetic control pulse MSP is created a first time after the count code CNT<1:3> is initialized to have a logic level combination of '000', the count code CNT<1:3> may be generated to have a logic level combination of '001' by a counting operation of the counter 65. In addition, if the arithmetic control pulse MSP is created a second time, the count code CNT<1:3> may be generated to have a logic level combination of '010' by a counting operation of the counter 65. Moreover, if the arithmetic control pulse MSP is created a third time, the count code CNT<1:3> may be generated to have a logic level combination of '011' by a counting operation of the counter 65. In the count code CNT<1:3>, a logic level combination of '001' means that a first count code CNT<1> has a logic "high(1)" level and second and third count codes CNT<2:3> have a logic "low(0)" level.

The comparison circuit 67 may compare the count code CNT<1:T> with the target code SC<1:T> to generate the comparison pulse COMP. The comparison circuit 67 may generate the comparison pulse COMP when the count code CNT<1:T> is different from the target code SC<1:T>. For example, when the arithmetic control pulse MSP is created a second time to generate the count code CNT<1:3> having a logic level combination of '010' while the target code SC<1:T> is set to have a logic level combination of '011', the comparison circuit 67 may generate the comparison pulse COMP. Subsequently, when the arithmetic control pulse MSP is created a third time to generate the count code CNT<1:3> having a logic level combination of '011' while the target code SC<1:T> is set to have a logic level combination of '011', the comparison circuit 67 may terminate generation of the comparison pulse COMP.

The arithmetic circuit 69 may receive the first and second core data CD1 and CD2 to perform the arithmetic operation, used in the neural network, with the first and second core data CD1 and CD2 and to generate the arithmetic result data LDATA when the arithmetic control pulse MSP is generated. The arithmetic operation may be performed using various functions such as SIGMOID, Tanh, ReLU or the like.

Figure 12:
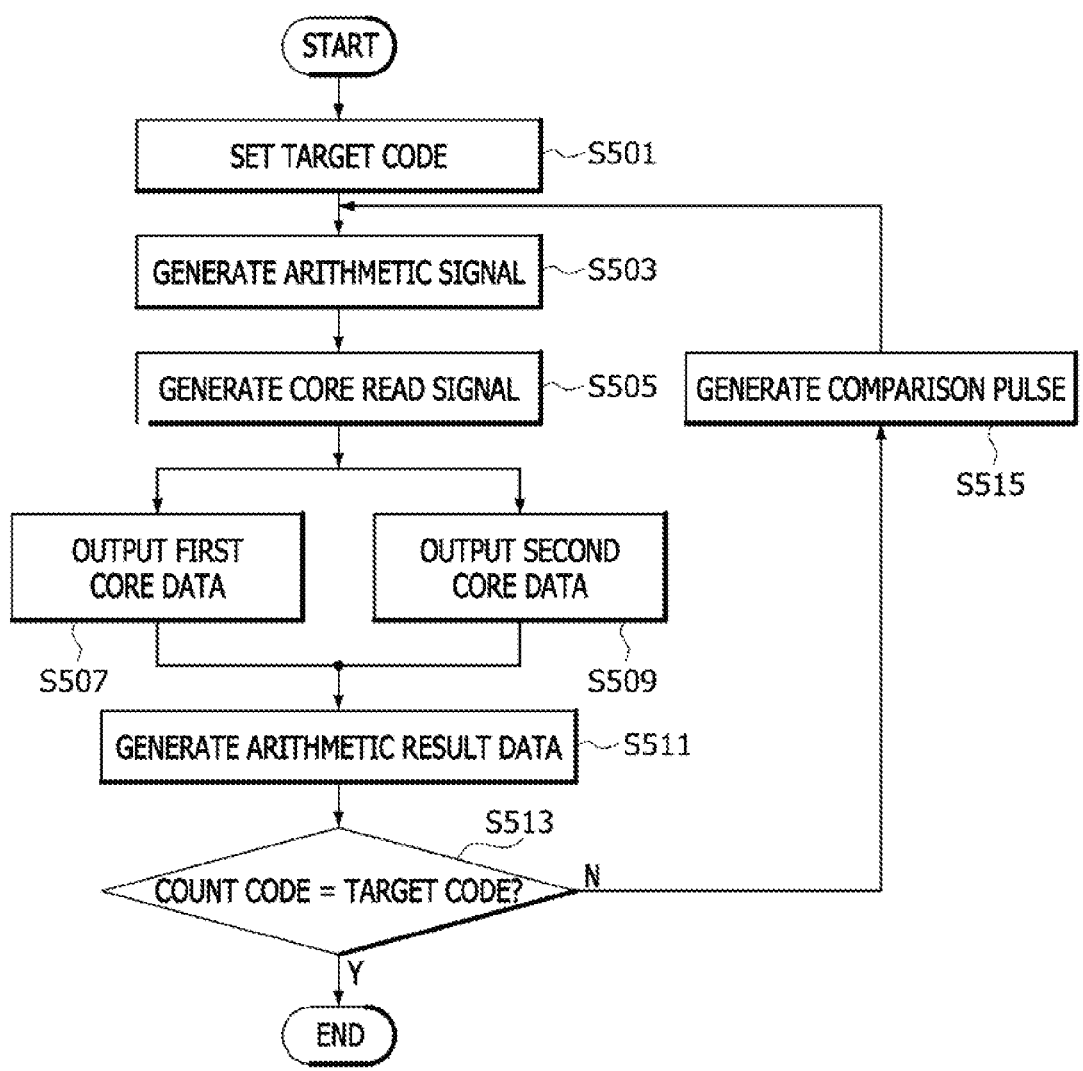
FIG. 12 is a flowchart, illustrating operations of the semiconductor system, shown in FIG. 10.

Operations of the semiconductor system 5 will be described in detail hereinafter with reference to FIG. 12.

When the controller 51 applies the third command CMD_MRS to the semiconductor device 53, the semiconductor device 53 may set the target code SC<1:T> which is extracted from the address ADD<1:L> (see a step S501). When the controller 51 applies the first command CMD_CS, the second command CMD_MAC, and the address ADD<1:L> to the semiconductor device 53, the semiconductor device 53 may generate the arithmetic signal MAC from the first and second commands CMD_CS and CMD_MAC (see a step S503) and may also generate the core read signal CRD from the first and second commands CMD_CS and CMD_MAC (see a step S505). When the core read signal CRD is generated, the data stored in the cells selected by the cell block selection signal BS<1:M> and the cell selection signal CES<1:N> may be outputted as the first and second core data CD1 and CD2 (see steps S507 and S509). As a result of the arithmetic operation of the first and second core data CD1 and CD2, the arithmetic result data LDATA may be generated (see a step S511). The count code CNT<1:T> generated when the arithmetic signal MAC is generated may be compared with the target code SC<1:T> (see a step S513), and the comparison pulse COMP may be generated when the count code CNT<1:T> is different from the target code SC<1:T> (see a step S515). Whenever the comparison pulse COMP is generated, the steps S503~S511 for performing the arithmetic operation may be sequentially performed to generate the arithmetic result data LDATA. When the count code CNT<1:T> is consistent with the target code SC<1:T>, the arithmetic operation may terminate because the comparison pulse COMP is not created.

As described above, the semiconductor device 53 of the semiconductor system 5 based on an embodiment may receive the third command CMD_MRS to set the number of times that the arithmetic operation is repeatedly performed and may receive the first and second commands CMD_CS and CMD_MAC only once to repeatedly perform the arithmetic operation of the first and second core data CD1 and CD2 by the number of times and to generate the arithmetic result data LDATA. Thus, it may be possible to enhance the efficiency of the arithmetic operation and to improve the speed of the arithmetic operation.

Figure 13:
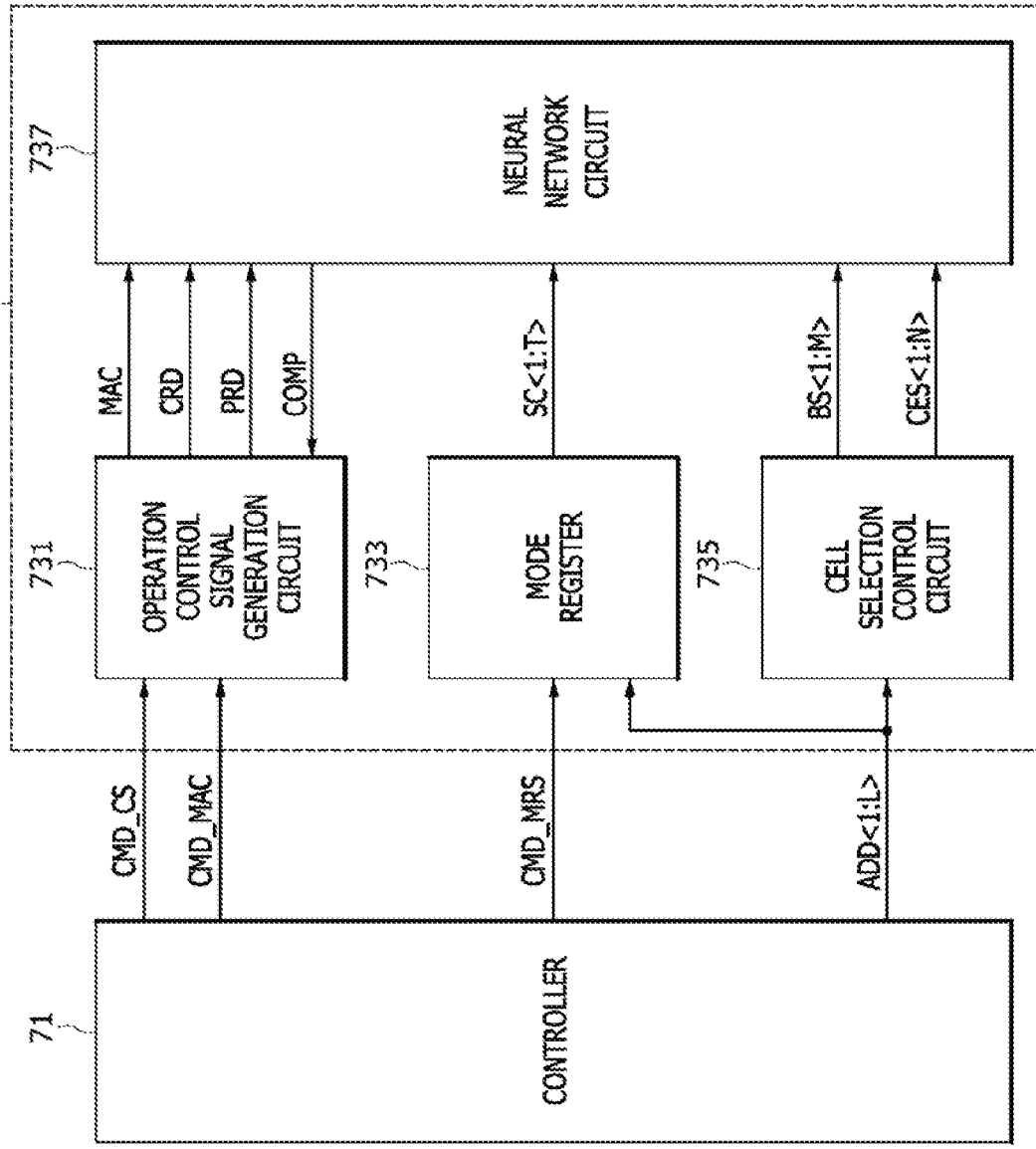
FIG. 13 is a block diagram, illustrating a configuration of a semiconductor system, based on another embodiment of the present disclosure.

As illustrated in FIG. 13, a semiconductor system 7 based on an embodiment may include a controller 71 and a semiconductor device 73. The semiconductor device 73 may include an operation control signal generation circuit 731, a mode register 733, a cell selection control circuit 735, and a neural network circuit 737.

The controller 71 may generate and output a first command CMD_CS, a second command CMD_MAC, a third command CMD_MRS, and an address ADD<1:L> to the semiconductor device 73. The controller 71 may transmit the first command CMD_CS, the second command CMD_MAC, the third command CMD_MRS, and the address ADD<1:L> to the semiconductor device 73 through signal lines that the first to third commands CMD_CS, CMD_MAC, and CMD_MRS and the address ADD<1:L> share with each other. In some embodiments, the controller 71 may be synchronized with a clock signal (not shown) to transmit the first command CMD_CS, the second command CMD_MAC, the third command CMD_MRS, and the address ADD<1:L> to the semiconductor device 73. The number "L" of bits of the address ADD<1:L> may be different based on the embodiments.

The operation control signal generation circuit 731 may generate an arithmetic signal MAC, a core read signal CRD, and a peripheral read signal PRD based on the first command CMD_CS, the second command CMD_MAC, and a comparison pulse COMP. The operation control signal generation circuit 731 may generate the arithmetic signal MAC, the core read signal CRD, and the peripheral read signal PRD when the first command CMD_CS and the second command CMD_MAC are generated. The arithmetic signal MAC may be generated to perform an arithmetic operation used in a neural network (i.e., the neural network circuit 737). The core read signal CRD may be generated to perform a read operation for outputting core data (CD of FIG. 14) from a core region (81 of FIG. 14). The peripheral read signal PRD may be generated to perform a read operation for inputting peripheral data (PD of FIG. 14) into a peripheral region (83 of FIG. 14) through a pad (82 of FIG. 14) and for outputting the peripheral data (PD of FIG. 14) from the peripheral region (83 of FIG. 14). In some embodiments, the operation control signal generation circuit 731 may generate the core read signal CRD and the peripheral read signal PRD after generating the arithmetic signal MAC. The operation control signal generation circuit 731 may generate the arithmetic signal MAC, the core read signal CRD, and the peripheral read signal PRD when the comparison pulse COMP is created. The operation control signal generation circuit 731 may be realized such that the comparison pulse COMP is buffered to generate the arithmetic signal MAC, the core read signal CRD, and the peripheral read signal PRD.

The mode register 733 may extract a target code SC<1:T> from the address ADD<1:L> to store the target code SC<1:T> therein when the third command CMD_MRS is generated. Bits used for extracting the target code SC<1:T> from the address ADD<1:L> among bits included in the address ADD<1:L> may be different based on the embodiments. A logic level combination of the target code SC<1:T> may be set to correspond to the number of times that the arithmetic operation is repeatedly performed whenever the first and second commands CMD_CS and CMD_MAC for generating the arithmetic signal MAC are generated once.

The cell selection control circuit 735 may generate a cell block selection signal BS<1:M> and a cell selection signal CES<1:N> based on the address ADD<1:L>. The cell selection control circuit 735 may decode the address ADD<1:L> to generate the cell block selection signal BS<1:M> and the cell selection signal CES<1:N>. A logic level combination of the cell block selection signal BS<1:M> may be set to select one of cell blocks included in the core region (81 of FIG. 14). A logic level combination of the cell selection signal CES<1:N> may be set to select at least one of cells included in the selected cell block. The number "M" of bits of the cell block selection signal BS<1:M> may be different based on the embodiments. The number "N" of bits of the cell selection signal CES<1:N> may also be set to be different based on the embodiments.

The neural network circuit 737 may output the core data (CD of FIG. 14) from the core region (81 of FIG. 14) when the core read signal CRD is generated, may output the peripheral data (PD of FIG. 14) from the peripheral region (83 of FIG. 14) when the peripheral read signal PRD is generated, and may perform the arithmetic operation of the core data (CD of FIG. 14) and the peripheral data (PD of FIG. 14) to generate an arithmetic result data (LDATA of FIG. 14) based on an arithmetic control pulse (MSP of FIG. 14) generated from the arithmetic signal MAC. The neural network circuit 737 may discriminate whether the arithmetic operation is repeatedly performed by a predetermined number of times, which is set by the target code SC<1:T>, to generate the comparison pulse COMP. The neural network circuit 737 may repeatedly perform the arithmetic operation by the predetermined number of times, which is set by the target code SC<1:T>, to generate the arithmetic result data (LDATA of FIG. 14) for each arithmetic operation.

The word "predetermined" as used herein with respect to a parameter, such as a predetermined number of times, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 14:
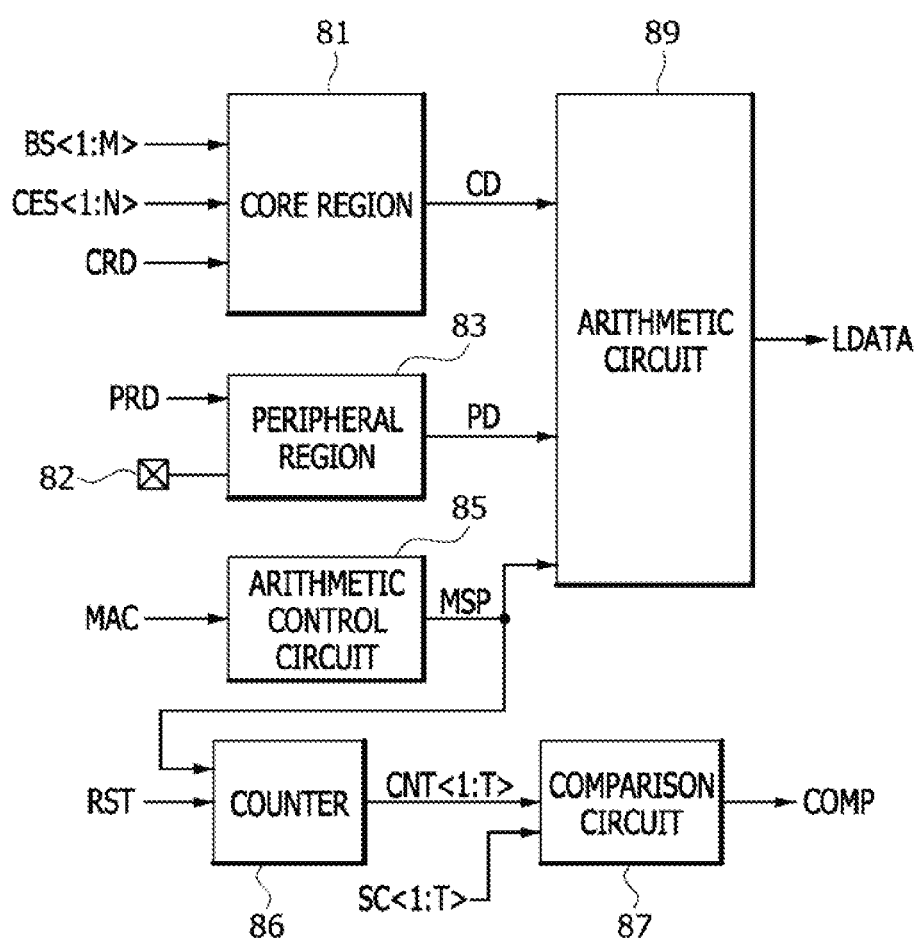
FIG. 14 is a block diagram, illustrating an example of a neural network circuit, included in the semiconductor system of FIG. 13.

Referring to FIG. 14, the neural network circuit 737 may include the core region 81, the pad 82, the peripheral region 83, an arithmetic control circuit 85, a counter 86, a comparison circuit 87, and an arithmetic circuit 89.

The core region 81 may include a plurality of cell blocks, and each of the plurality of cell blocks may include a plurality of cells. The core region 81 may receive the cell block selection signal BS<1:M> and the cell selection signal CES<1:N> to select one of the plurality of cell blocks and some of the plurality of cells included in the selected cell block and may output data stored in the selected cells as the core data CD, when the core read signal CRD is generated. A circuit for outputting the data stored in the selected cells may be realized using a general circuit which is employed in the read operation. The core data CD may be set as the feature values or weighted values, used in the neural network.

The peripheral region 83 may receive the peripheral data PD through the pad 82 and may output the peripheral data PD when the peripheral read signal PRD is generated. The peripheral data PD may be set as the feature values or the weighted values.

The arithmetic control circuit 85 may generate the arithmetic control pulse MSP when the arithmetic signal MAC is generated. The arithmetic control circuit 85 may include a delay circuit (not shown) such that the arithmetic control pulse MSP is generated when a delay period elapses when the arithmetic signal MAC is generated. The arithmetic control circuit 85 may generate the arithmetic control pulse MSP after the core data CD and the peripheral data PD are outputted from the core region 81.

The counter 86 may initialize a count code CNT<1:T> when a reset signal RST is generated. The reset signal RST may be generated when an initialization operation that a power supply voltage is applied to the semiconductor system 7 is performed. The count code CNT<1:T> may be initialized such that all of bits included in the count code CNT<1:T> have a logic "low" level. The counter 86 may perform a counting operation to generate the count code CNT<1:T> when the arithmetic control pulse MSP is created.

The comparison circuit 87 may compare the count code CNT<1:T> with the target code SC<1:T> to generate the comparison pulse COMP. The comparison circuit 87 may generate the comparison pulse COMP when the count code CNT<1:T> is different from the target code SC<1:T>.

The arithmetic circuit 89 may receive the core data CD and the peripheral data PD to perform the arithmetic operation, used in the neural network, with the core data CD and the peripheral data PD to generate the arithmetic result data LDATA when the arithmetic control pulse MSP is generated. The arithmetic operation may be performed using various functions such as SIGMOID, Tanh, ReLU or the like.

Figure 15:
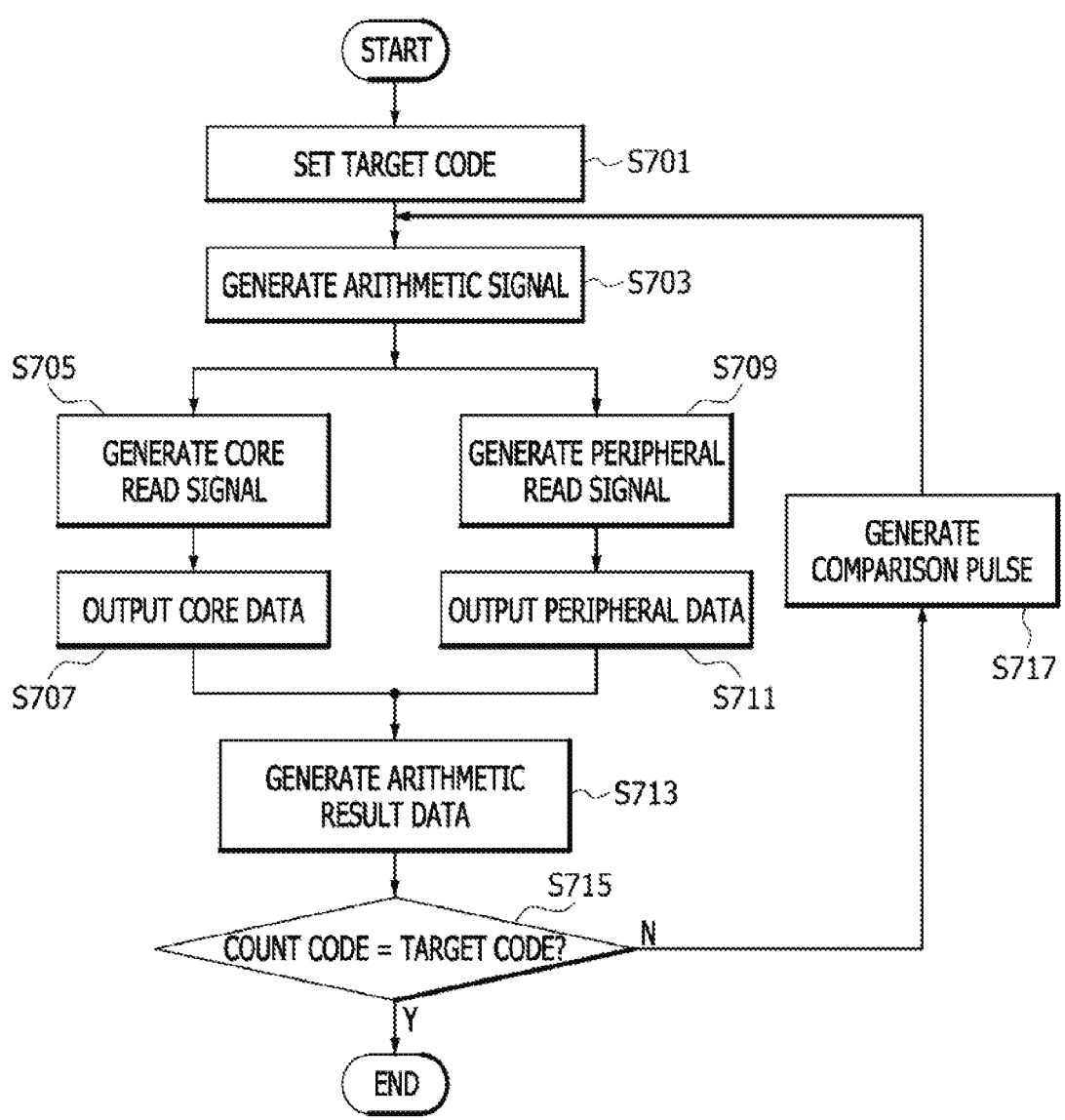
FIG. 15 is a flowchart, illustrating operations of the semiconductor system, shown in FIG. 13.

Operations of the semiconductor system 7 will be described in detail hereinafter with reference to FIG. 15.

When the controller 71 applies the third command CMD_MRS to the semiconductor device 73, the semiconductor device 73 may set the target code SC<1:T> which is extracted from the address ADD<1:L> (see a step S701). When the controller 71 applies the first command CMD_CS, the second command CMD_MAC, and the address ADD<1:L> to the semiconductor device 73, the semiconductor device 73 may generate the arithmetic signal MAC from the first and second commands CMD_CS and CMD_MAC (see a step S703) and may also generate the core read signal CRD and the peripheral read signal PRD from the first and second commands CMD_CS and CMD_MAC (see steps S705 and S709). When the core read signal CRD is generated, the data stored in the cells selected by the cell block selection signal BS<1:M> and the cell selection signal CES<1:N> may be outputted as the core data CD (see a step S707). When the peripheral read signal PRD is generated, the peripheral data PD may be outputted from the peripheral region 83 (see a step S711). As a result of the arithmetic operation of the core data CD and the peripheral data PD, the arithmetic result data LDATA may be generated (see a step S713). The count code CNT<1:T> generated when the arithmetic signal MAC is generated may be compared with the target code SC<1:T> (see a step S715), and the comparison pulse COMP may be generated when the count code CNT<1:T> is different from the target code SC<1:T> (see a step S717). Whenever the comparison pulse COMP is generated, the steps S503~S511 for performing the arithmetic operation may be sequentially performed to generate the arithmetic result data LDATA. When the count code CNT<1:T> is consistent with the target code SC<1:T>, the arithmetic operation may terminate because the comparison pulse COMP is not created.

As described above, the semiconductor device 73 of the semiconductor system 7 based on an embodiment may receive the third command CMD_MRS to set the number of times that the arithmetic operation is repeatedly performed and may receive the first and second commands CMD_CS and CMD_MAC only once to repeatedly perform the arithmetic operation of the core data CD and the peripheral data PD by the number of times and to generate the arithmetic result data LDATA. Thus, it may be possible to enhance the efficiency of the arithmetic operation and to improve the speed of the arithmetic operation.

Figure 16:
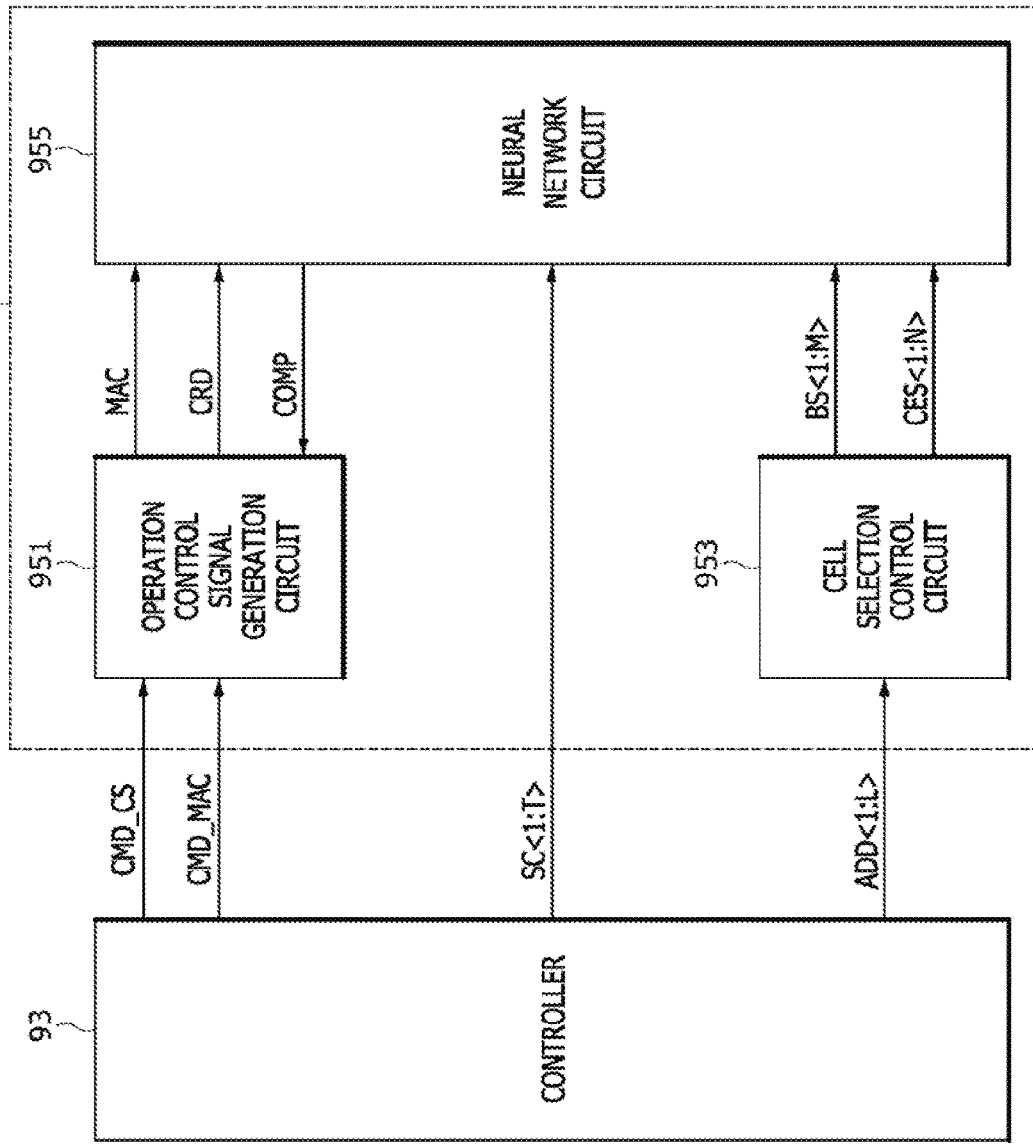
FIG. 16 is a block diagram, illustrating a configuration of a semiconductor system, based on another embodiment of the present disclosure.

As illustrated in FIG. 16, a semiconductor system 91 based on an embodiment may include a controller 93 and a semiconductor device 95. The semiconductor device 95 may include an operation control signal generation circuit 951, a cell selection control circuit 953, and a neural network circuit 955.

The controller 93 may generate and output a first command CMD_CS, a second command CMD_MAC, a target code SC<1:T>, and an address ADD<1:L> to the semiconductor device 95. The controller 93 may transmit the first command CMD_CS, the second command CMD_MAC, the target code SC<1:T>, and the address ADD<1:L> to the semiconductor device 95 through signal lines that the first and second commands CMD_CS and CMD_MAC, the target code SC<1:T>, and the address ADD<1:L> share with each other. In some embodiments, the controller 93 may be synchronized with a clock signal (not shown) to transmit the first command CMD_CS, the second command CMD_MAC, the target code SC<1:T>, and the address ADD<1:L> to the semiconductor device 95. The number "T" of bits of the target code SC<1:T> may be different based on the embodiments. The number "L" of bits of the address ADD<1:L> may be different based on the embodiments.

The operation control signal generation circuit 951 may generate an arithmetic signal MAC and a core read signal CRD based on the first command CMD_CS, the second command CMD_MAC, and a comparison pulse COMP. The operation control signal generation circuit 951 may generate the arithmetic signal MAC and the core read signal CRD when the first command CMD_CS and the second command CMD_MAC are generated. The arithmetic signal MAC may be generated to perform an arithmetic operation used in a neural network (i.e., the neural network circuit 955). The core read signal CRD may be generated to perform a read operation for outputting first core data and second core data from a core region. In some embodiments, the operation control signal generation circuit 951 may generate the core read signal CRD after generating the arithmetic signal MAC. The operation control signal generation circuit 951 may generate the arithmetic signal MAC and the core read signal CRD when the comparison pulse COMP is created. The operation control signal generation circuit 951 may be realized such that the comparison pulse COMP is buffered to generate the arithmetic signal MAC and the core read signal CRD.

The cell selection control circuit 953 may generate a cell block selection signal BS<1:M> and a cell selection signal CES<1:N> based on the address ADD<1:L>. The cell selection control circuit 953 may decode the address ADD<1:L> to generate the cell block selection signal BS<1:M> and the cell selection signal CES<1:N>. A logic level combination of the cell block selection signal BS<1:M> may be set to select one of cell blocks included in the core region. A logic level combination of the cell selection signal CES<1:N> may be set to select at least one of cells included in the selected cell block. The number "M" of bits of the cell block selection signal BS<1:M> may be different based on the embodiments. The number "N" of bits of the cell selection signal CES<1:N> may also be set to be different based on the embodiments.

The neural network circuit 955 may output the first and second core data from the core region when the core read signal CRD is generated and may perform the arithmetic operation of the first and second core data to generate an arithmetic result data based on an arithmetic control pulse generated from the arithmetic signal MAC. The neural network circuit 955 may discriminate whether the arithmetic operation is repeatedly performed by a predetermined number of times, which is set by the target code SC<1:T>, to generate the comparison pulse COMP. The neural network circuit 955 may repeatedly perform the arithmetic operation by the predetermined number of times, which is set by the target code SC<1:T>, to generate the arithmetic result data for each arithmetic operation.

As illustrated in FIG. 17, a semiconductor system 96 based on an embodiment may include a controller 97 and a semiconductor device 99. The semiconductor device 99 may include an operation control signal generation circuit 991, a cell selection control circuit 993, and a neural network circuit 995.

The controller 97 may generate and output a first command CMD_CS, a second command CMD_MAC, a target code SC<1:T>, and an address ADD<1:L> to the semiconductor device 99. The controller 97 may transmit the first command CMD_CS, the second command CMD_MAC, the target code SC<1:T>, and the address ADD<1:L> to the semiconductor device 99 through signal lines that the first and second commands CMD_CS and CMD_MAC, the target code SC<1:T>, and the address ADD<1:L> share with each other. In some embodiments, the controller 97 may be synchronized with a clock signal (not shown) to transmit the first command CMD_CS, the second command CMD_MAC, the target code SC<1:T>, and the address ADD<1:L> to the semiconductor device 99. The number "T" of bits of the target code SC<1:T> may be different based on the embodiments. The number "L" of bits of the address ADD<1:L> may be different based on the embodiments.

The operation control signal generation circuit 991 may generate an arithmetic signal MAC, a core read signal CRD, and a peripheral read signal PRD based on the first command CMD_CS, the second command CMD_MAC, and a comparison pulse COMP. The operation control signal generation circuit 991 may generate the arithmetic signal MAC, the core read signal CRD, and the peripheral read signal PRD when the first command CMD_CS and the second command CMD_MAC are generated. The arithmetic signal MAC may be generated to perform an arithmetic operation used in a neural network (i.e., the neural network circuit 995). The core read signal CRD may be generated to perform a read operation for outputting core data from a core region. The peripheral read signal PRD may be generated to perform a read operation for inputting peripheral data into a peripheral region through a pad and for outputting the peripheral data from the peripheral region. In some embodiments, the operation control signal generation circuit 991 may generate the core read signal CRD and the peripheral read signal PRD after generating the arithmetic signal MAC. The operation control signal generation circuit 991 may generate the arithmetic signal MAC, the core read signal CRD, and the peripheral read signal PRD when the comparison pulse COMP is created. The operation control signal generation circuit 991 may be realized such that the comparison pulse COMP is buffered to generate the arithmetic signal MAC, the core read signal CRD, and the peripheral read signal PRD.

The cell selection control circuit 993 may generate a cell block selection signal BS<1:M> and a cell selection signal CES<1:N> based on the address ADD<1:L>. The cell selection control circuit 993 may decode the address ADD<1:L> to generate the cell block selection signal BS<1:M> and the cell selection signal CES<1:N>. A logic level combination of the cell block selection signal BS<1:M> may be set to select one of cell blocks included in the core region. A logic level combination of the cell selection signal CES<1:N> may be set to select at least one of cells included in the selected cell block. The number "M" of bits of the cell block selection signal BS<1:M> may be different based on the embodiments. The number "N" of bits of the cell selection signal CES<1:N> may also be set to be different based on the embodiments.

The neural network circuit 995 may output the core data from the core region when the core read signal CRD is generated, may output the peripheral data from the peripheral region when the peripheral read signal PRD is generated, and may perform the arithmetic operation of the core data and the peripheral data to generate an arithmetic result data based on an arithmetic control pulse generated from the arithmetic signal MAC. The neural network circuit 995 may discriminate whether the arithmetic operation is repeatedly performed by a predetermined number of times, which is set by the target code SC<1:T>, to generate the comparison pulse COMP. The neural network circuit 995 may repeatedly perform the arithmetic operation by the predetermined number of times, which is set by the target code SC<1:T>, to generate the arithmetic result data for each arithmetic operation.

Based on the embodiments described above, a plurality of internal operations may be performed based on a command inputted once, thereby enhancing the efficiency of the internal operations and improving the speed of the internal operations.

In addition, based on the embodiments described above, feature values and weighted values used in a neural network may be outputted from a core region based on a command inputted once, thereby enhancing the efficiency of arithmetic operations and improving the speed of the arithmetic operations.

Moreover, based on the embodiments described above, feature values and weighted values used in a neural network may be outputted from a core region and a peripheral region based on a command inputted once, thereby enhancing the efficiency of arithmetic operations and improving the speed of the arithmetic operations.

Furthermore, based on the embodiments described above, the number of times that an arithmetic operation is repeatedly performed may be set, and the arithmetic operation of feature values and weighted values generated based on a command inputted once may be repeatedly performed by the number of times. Thus, it may be possible to enhance the efficiency of the arithmetic operations used in a neural network and to improve the speed of the arithmetic operations.

What is claimed is:

1. A semiconductor device comprising:
an operation control signal generation circuit configured to generate an arithmetic signal and a core read signal based on a command; and
a neural network circuit configured to output a first core data and a second core data, from a core region, based on the core read signal, a cell block selection signal, and a cell selection signal, and configured to perform an arithmetic operation of the first and second core data based on the arithmetic signal to generate an arithmetic result data.

2. The semiconductor device of claim 1, wherein the cell block selection signal and the cell selection signal are extracted from an address.

3. The semiconductor device of claim 1,
wherein the core region includes a plurality of cell blocks,
wherein each of the plurality of cell blocks includes a plurality of cells,
wherein one of the plurality of cell blocks is selected by the cell block selection signal, and
wherein at least one of the plurality of cells, included in each of the plurality of cell blocks, may be selected by the cell selection signal.

4. The semiconductor device of claim 3, wherein the core region outputs data, stored in the cells, selected by the cell block selection signal, and the cell selection signal as the first core data and the second core data when the core read signal is generated.

5. The semiconductor device of claim 1,
wherein the first core data is set as feature values, used in a neural network; and
wherein the second core data is set as weighted values, used in the neural network.

6. The semiconductor device of claim 1,
wherein the first core data is set as weighted values, used in a neural network; and
wherein the second core data is set as feature values, used in the neural network.

7. The semiconductor device of claim 1, wherein the arithmetic operation is performed, using functions, which are employed in a neural network.

8. The semiconductor device of claim 1, wherein the neural network circuit further includes:
an arithmetic control circuit configured to generate an arithmetic control pulse based on the arithmetic signal; and
an arithmetic circuit configured to perform the arithmetic operation of the first core data and the second core data to generate the arithmetic result data when the arithmetic control pulse is generated.

9. A semiconductor device comprising:
an operation control signal generation circuit configured to generate an arithmetic signal, a core read signal, and a peripheral read signal based on a command; and
a neural network circuit configured to output a core data, from the core region, based on the core read signal, a cell block selection signal, and a cell selection signal, configured to input peripheral data into a peripheral region through a pad, configured to output the peripheral data from the peripheral region based on the peripheral read signal, and configured to perform an arithmetic operation of the core data and the peripheral data based on the arithmetic signal to generate an arithmetic result data.

10. The semiconductor device of claim 9,
wherein the core data is set as feature values, used in a neural network; and
wherein the peripheral data is set as weighted values, used in the neural network.

11. The semiconductor device of claim 9,
wherein the core data is set as weighted values, used in a neural network; and
wherein the peripheral data is set as feature values, used in the neural network.

12. The semiconductor device of claim 9, wherein the neural network circuit further includes:
an arithmetic control circuit configured to generate an arithmetic control pulse based on the arithmetic signal; and
an arithmetic circuit configured to perform the arithmetic operation of the core data and the peripheral data to generate the arithmetic result data when the arithmetic control pulse is generated.

13. A semiconductor device comprising:
an operation control signal generation circuit configured to generate an arithmetic signal and a core read signal based on a first command and a comparison pulse;

a mode register configured to extract a target code from an address and to store the target code therein based on a second command; and a neural network circuit configured to output a first core data and a second core data, from a core region, based on the core read signal, a cell block selection signal, and a cell selection signal, configured to perform an arithmetic operation of the first core data and the second core data based on the arithmetic signal to generate an arithmetic result data, configured to generate a count code based on the arithmetic signal, and configured to compare the count code with the target code to generate the comparison pulse.

14. The semiconductor device of claim 13, wherein the operation control signal generation circuit is configured to generate the arithmetic signal and the core read signal when the first command is generated and is configured to generate the arithmetic signal and the core read signal when the comparison pulse is generated.

15. The semiconductor device of claim 13, wherein the comparison pulse is generated when the count code is different from the target code.

16. The semiconductor device of claim 13, wherein the neural network circuit further includes:

an arithmetic control circuit configured to generate an arithmetic control pulse based on the arithmetic signal;

a counter configured to perform a counting operation to generate the count code when the arithmetic control pulse is generated;

a comparison circuit configured to compare the count code with the target code to generate the comparison pulse; and an arithmetic circuit configured to perform the arithmetic operation of the first core data and the second core data to generate the arithmetic result data when the arithmetic control pulse is generated.

17. A semiconductor device comprising:

an operation control signal generation circuit configured to generate an arithmetic signal, a core read signal, and a peripheral read signal based on a first command and a comparison pulse;

a mode register configured to extract a target code from an address and to store the target code therein based on a second command; and a neural network circuit configured to output a core data, from a core region, based on the core read signal, a cell block selection signal, and a cell selection signal, configured to input peripheral data into a peripheral region through a pad based on the peripheral read signal, configured to perform an arithmetic operation of the core data and the peripheral data based on the arithmetic signal to generate an arithmetic result data, configured to generate a count code based on the arithmetic signal, and configured to compare the count code with the target code to generate the comparison pulse.

18. The semiconductor device of claim 17, wherein the operation control signal generation circuit is configured to generate the arithmetic signal, the core read signal, and the peripheral read signal when the first command is generated and is configured to generate the arithmetic signal, the core read signal, and the peripheral read signal when the comparison pulse is generated.

19. A semiconductor device comprising:

an operation control signal generation circuit configured to generate an arithmetic signal and a core read signal based on a command and a comparison pulse; and a neural network circuit configured to output a first core data and a second core data, from a core region, based on the core read signal, a cell block selection signal, and a cell selection signal, configured to perform an arithmetic operation of the first and second core data based on the arithmetic signal to generate an arithmetic result data, configured to generate a count code based on the arithmetic signal, and configured to compare the count code with a target code to generate the comparison pulse.

20. A semiconductor device comprising:

an operation control signal generation circuit configured to generate an arithmetic signal, a core read signal, and a peripheral read signal based on a command and a comparison pulse; and a neural network circuit configured to output a core data, from a core region, based on the core read signal, a cell block selection signal, and a cell selection signal, configured to input peripheral data into a peripheral region through a pad based on the peripheral read signal, configured to perform an arithmetic operation of the core data and the peripheral data based on the arithmetic signal to generate an arithmetic result data, configured to generate a count code based on the arithmetic signal, and configured to compare the count code with a target code to generate the comparison pulse.

* * * * *